United States Patent
Lee et al.

(10) Patent No.: US 10,635,879 B2
(45) Date of Patent: Apr. 28, 2020

(54) METHOD OF DISPLAYING USER INTERFACE RELATED TO USER AUTHENTICATION AND ELECTRONIC DEVICE FOR IMPLEMENTING SAME

(71) Applicant: Samsung Electronics Co., Ltd., Suwon-si, Gyeonggi-do (KR)

(72) Inventors: Hyemi Lee, Seoul (KR); Hyung-Woo Shin, Seoul (KR); Kyungsoo Lim, Yongin-si (KR); Pil-Joo Yoon, Seongnam-si (KR); Haedong Lee, Daegu (KR); Yong-Gil Han, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 15/808,249

(22) Filed: Nov. 9, 2017

(65) Prior Publication Data

US 2018/0129853 A1    May 10, 2018

(30) Foreign Application Priority Data

Nov. 9, 2016   (KR) .................. 10-2016-0148535

(51) Int. Cl.
*G06K 9/00* (2006.01)
*G06F 21/32* (2013.01)
(Continued)

(52) U.S. Cl.
CPC ....... *G06K 9/00013* (2013.01); *G06F 3/0484* (2013.01); *G06F 3/0487* (2013.01);
(Continued)

(58) Field of Classification Search
CPC combination set(s) only.
See application file for complete search history.

(56) References Cited

U.S. PATENT DOCUMENTS

| 9,733,740 | B2 | 8/2017 | Cho et al. |
| 2002/0003892 | A1* | 1/2002 | Iwanaga ............ G06K 9/00026 382/124 |

(Continued)

FOREIGN PATENT DOCUMENTS

| EP | 3054399 A1 | 8/2016 |
| JP | 2013229003 A | 11/2013 |

(Continued)

OTHER PUBLICATIONS

Extended European Search Report dated Jul. 8, 2019, issued in European Application No. 17870395.5.

(Continued)

*Primary Examiner* — Alex Kok S Liew
(74) *Attorney, Agent, or Firm* — Jefferson IP Law, LLP

(57) ABSTRACT

A method and an apparatus are provided. The method and apparatus include a display, a fingerprint sensor formed in at least a part of a display area of the display, and a processor, wherein the processor is configured to identify content including at least one object to be displayed on the display, when the content is not associated with acquisition of fingerprint information, display the at least one object at a predetermined position, and when the content is associated with the acquisition of the fingerprint information, display the at least one object in at least the part of the display area in which the fingerprint sensor is formed. Other embodiments are also possible.

13 Claims, 24 Drawing Sheets

(51) Int. Cl.
*G06F 3/0487* (2013.01)
*G06F 3/0484* (2013.01)
*G06Q 20/00* (2012.01)
*G06F 3/0488* (2013.01)
*G06F 21/62* (2013.01)
*G06Q 20/40* (2012.01)

(52) U.S. Cl.
CPC ........ *G06F 3/0488* (2013.01); *G06F 3/04842* (2013.01); *G06F 3/04845* (2013.01); *G06F 21/32* (2013.01); *G06F 21/6245* (2013.01); *G06Q 20/00* (2013.01); *G06Q 20/40145* (2013.01); *G06K 9/00087* (2013.01)

(56) References Cited

U.S. PATENT DOCUMENTS

2012/0036556 A1* 2/2012 LeBeau ................ G06F 3/048
                                                                  726/3
2014/0047706 A1   2/2014  Shaikh et al.
2014/0359757 A1  12/2014  Sezan et al.
2015/0086090 A1   3/2015  Jung et al.
2016/0063230 A1   3/2016  Alten
2016/0224823 A1   8/2016  Cho et al.
2017/0161382 A1*  6/2017  Ouimet ................ G06F 16/78
2017/0337542 A1  11/2017  Kim et al.

FOREIGN PATENT DOCUMENTS

KR     20150146236 A    12/2015
KR     10-2016-0022541 A  3/2016
KR     10-2016-0105296 A  9/2016

OTHER PUBLICATIONS

Australian Office Action dated Feb. 7, 2020, issued in Australian Patent Application No. 2017358278.

* cited by examiner

METHOD OF DISPLAYING USER INTERFACE RELATED TO USER AUTHENTICATION AND ELECTRONIC DEVICE FOR IMPLEMENTING SAME

CROSS-REFERENCE TO RELATED APPLICATION(S)

This application claims the benefit under 35 U.S.C. § 119(a) of a Korean patent application Serial No. 10-2016-0148535 filed in the Korean Intellectual Property Office on Nov. 9, 2016, the entire disclosure of which is hereby incorporated by reference.

TECHNICAL FIELD

The present disclosure relates to a method and a device for displaying a user interface (UI) related to user authentication.

BACKGROUND

With the recent development of digital technologies, various types of electronic devices such as mobile communication terminals, personal digital assistants (PDAs), electronic organizers, smart phones, tablet personal computers (PCs), or wearable devices have been widely used. Hardware parts and/or software parts of such electronic devices have continuously been improved in order to support and increase functions.

For example, the electronic device may tack a picture through a camera, provide a wayfinding service through a navigation function, and provide a payment service through an input of a password (or input of a secret pattern) or a fingerprint sensor. When the user is authenticated using a fingerprint sensor, the electronic device may keep higher security as compared to user authentication using a password input. Accordingly, electronic devices are developed to provide not only the payment service but also various services such as financial transactions using the fingerprint sensor.

The fingerprint sensor may be provided at a button (for example, a home button) of the electronic device, and the user may bring his/her finger into contact with the button of the electronic device in fingerprint recognition. In other implementations, the fingerprint sensor is located in a display area of the electronic device rather than the button of the electronic device. For example, when the fingerprint sensor is located at the part of the display area and a user interface (UI) is displayed in the display area, the user cannot know the location at which the fingerprint sensor is arranged and thus may have difficulty in using fingerprint recognition.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present of the present disclosure is to provide a method and an apparatus for, when a user interface (UI) component for user authentication is included in a UI, moving the UI component for user authentication to a fingerprint-recognizable position and displaying the moved UI component.

In accordance with an aspect of the present disclosure, an electronic device is provided. The electronic device includes a display, a fingerprint sensor formed in at least a part of a display area of the display, and a processor, wherein the processor is configured to identify content including at least one object to be displayed on the display, when the content is not associated with acquisition of fingerprint information, display the at least one object at a predetermined position, and, when the content is associated with the acquisition of the fingerprint information, display the at least one object in at least the part of the display area in which the fingerprint sensor is formed.

In accordance with another aspect of the present disclosure, a method of operating an electronic device is provided. The method includes identifying at least one object included in content to be displayed through a display functionally connected to the electronic device, determining whether there is an object for user authentication in the identified objects, and when there is the object for user authentication on the page, displaying the object for user authentication in at least a partial display area of the display in which a fingerprint sensor is formed.

In accordance with another aspect of the present disclosure, a computer-readable recording medium records a program for executing operations. The operations include identifying content including at least one object to be displayed on the display, when the content is not associated with acquisition of fingerprint information, displaying the at least one object at a predetermined positions, and when the content is associated with the acquisition of the fingerprint information, displaying the at least one object in at least the part of the display area in which the fingerprint sensor is formed.

According to various embodiments, when the object for user authentication is included in the content, it is possible to improve user convenience by moving the object for user authentication to a recognizable position and displaying the moved object.

According to various embodiments, the user can intuitively and rapidly perform an operation associated with user authentication through a fingerprint sensor embedded in the display.

According to various embodiments, it is possible to perform user authentication without pressing a separate fingerprint authentication button by judging a user's intention to press an object that requires fingerprint authentication within a user interface and recognizing a user's fingerprint through only one-time user input.

According to various embodiments, when user authentication is required within a predetermined time after fingerprint authentication is performed by the user once, it is possible to maintain the user authentication through previous fingerprint authentication without repeatedly performing the user authentication, thereby improving usability of the electronic device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
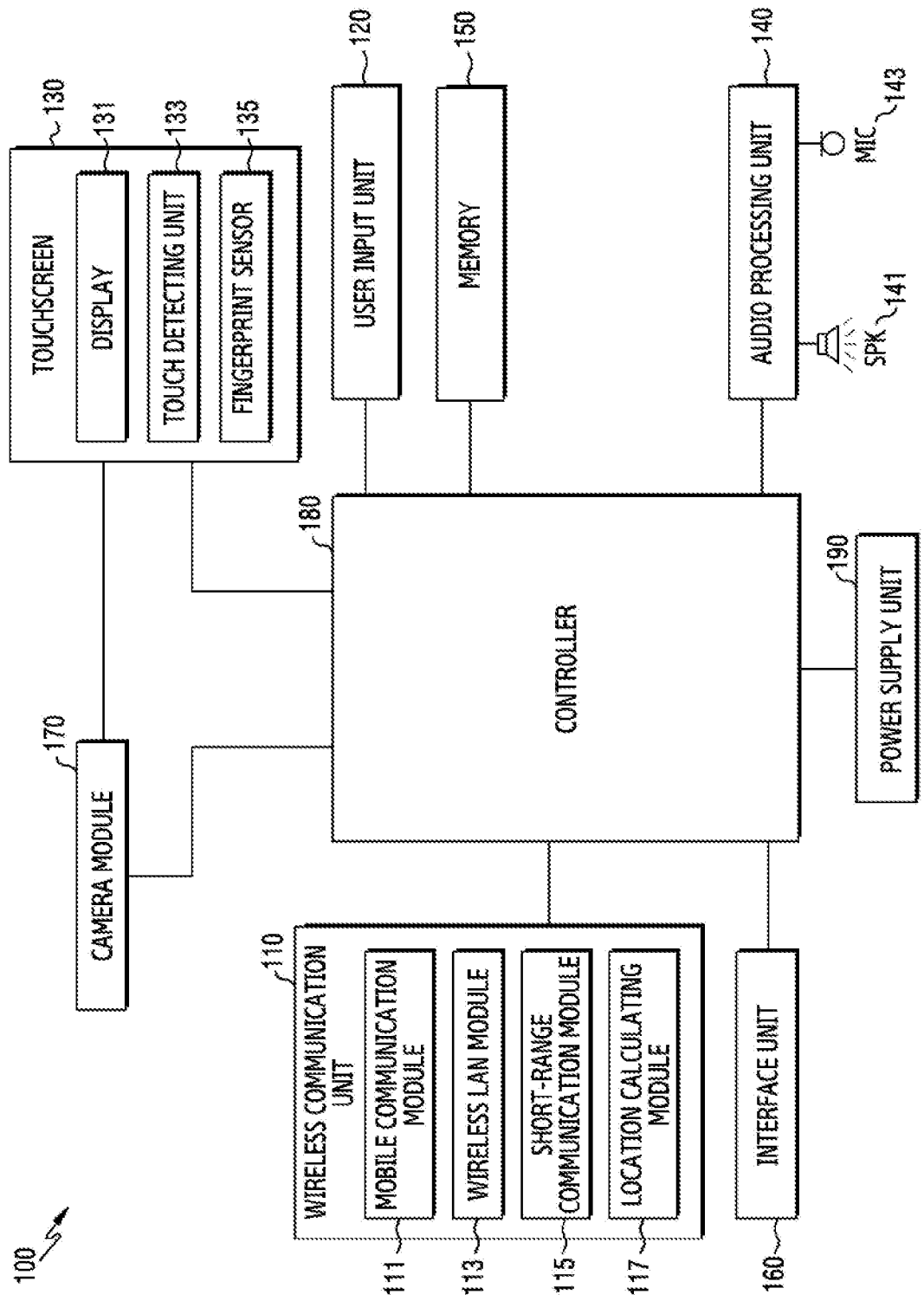
FIG. 1 illustrates a configuration of an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to an embodiment of the present disclosure, an electronic device may include all kinds of devices using one or more of various processors, such as an application processor (AP), a communication processor (CP), a graphic processing unit (GPU), and a central processing unit (CPU), like all information and communication devices, multimedia devices, wearable devices, and application devices therefor, which support functions according to various embodiments of the present disclosure (for example, a display function).

An electronic device according to an embodiment of the present disclosure may include at least one of, for example, smartphones, tablet personal computers (PCs), mobile phones, video telephones, electronic book readers, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices (for example, smart glasses, head-mounted-devices (HMDs), or smart watches).

According to an embodiment of the present disclosure, the electronic device may be a smart home appliance. For example, the smart home appliance may include at least one of televisions (TVs), digital versatile disc (DVD) players, refrigerators, air conditioners, cleaners, washing machines, set-top boxes, home automation control panels, TV boxes (e.g., Samsung HomeSync™, Apple TV™, or Google TV™), game consoles (e.g., Xbox™ and PlayStation™), or electronic picture frames. In addition, the electronic device according to an embodiment of the present disclosure may include at least one of navigation devices or Internet of Things.

According to various embodiments, the electronic device may be one of the above-mentioned devices or a combination of one or more devices. According to an embodiment, the electronic device may be a flexible electronic device. In addition, the electronic device according to an embodiment of the present disclosure is not limited to the above-mentioned devices and may include a new electronic device with the enhancement of technology.

In addition, the term "user" used in the various embodiments may refer to a person who uses the electronic device or a device that uses the electronic device (for example, an artificial intelligence electronic device). A module or a programming module according to various embodiments may include at least one of various elements of the present disclosure, or some of the elements may be omitted, or additional other elements may be further included. Operations performed by a module, a programming module, or other elements according to various embodiments may be executed sequentially, in parallel, repeatedly, or in a heuristic method. Also, a portion of operations may be executed in different sequences, omitted, or other operations may be added.

Hereinafter, a method and an apparatus for providing a user interface related to a note according to various embodiments of the present disclosure will be described with reference to the accompanying drawings. However, since various embodiments of the present disclosure are not restricted or limited by the following description, it should be noted that the present disclosure can be applied to various embodiments based on the following embodiments. In various embodiments described below, a hardware approach method will be described by way of an example. However, since various embodiments of the present disclosure include technology that uses both hardware and software, various embodiments of the present disclosure do not exclude an approach method based on software.

FIG. 1 is a view showing a configuration of an electronic device according to various embodiments of the present disclosure.

Referring to FIG. 1, an electronic device 100 may include a wireless communication unit 110, a user input unit (e.g., input circuitry, or input module) 120, a touch screen 130, an audio processor 140, a memory 150, an interface 160, a camera module 170, a controller 180, and a power supply module 190. The elements of the electronic device 100 shown in FIG. 1 are not essential in various embodiments of the present disclosure and thus the electronic device may include more elements or fewer elements than the elements shown in FIG. 1.

The wireless communication unit 110 may include one or more modules enabling wireless communication between the electronic device 100 and another external electronic device. According to various embodiments, the wireless communication unit 110 may include a module (for example, a short-range communication module, a long-range communication module, or the like) for communicating with neighbor external electronic devices. For example, the wireless communication unit 110 may include a mobile communication module 111, a wireless local area network (LAN) module 113, a short-range communication module 115, and a location calculation module 117.

The mobile communication module 111 may exchange radio signals with at least one of a base station, an external electronic device, and various servers (for example, an integration server, a provider server, a content server, an Internet server, or a cloud server) on a mobile communication network. The radio signals may include voice signals, data signals, or control signals of various formats. The mobile communication module 111 may transmit various data utilized to operate the electronic device 100 to an external device (for example, a server or another electronic device) in response to a user request. According to various embodiments, the mobile communication module 111 may exchange radio signals based on various communication methods. For example, the communication methods may include, but are not limited to, long term evolution (LTE), LTE-advanced (LTE-A), global system for mobile communication (GSM), enhanced data GSM environment (EDGE), code division multiple access (CDMA), wideband CDMA (WCDMA), universal mobile telecommunications system (UMTS), or orthogonal frequency division multiple access (OFDMA).

The wireless LAN module 113 may indicate a module for wirelessly connecting to the Internet and forming a wireless LAN link with other external electronic devices. The wireless LAN module 113 may be embedded in the electronic device 100 or may be provided outside the electronic device 100. The wireless Internet technology may use WiFi, wireless broadband (Wibro), world interoperability for microwave access (WiMax), high speed downlink packet access (HSDPA), or millimeter wave (mmWave), or the like. The wireless LAN module 113 may interwork with another external electronic device connected with the electronic device 100 via a network (for example, a wireless Internet network) to transmit various data of the electronic device 100 to the outside (for example, an external electronic device or a server) or to receive data from the outside. The wireless LAN module 113 may maintain an on state or may be turned on according to settings of the electronic device 100 or a user input.

The short-range communication module 115 may indicate a module for performing short-range communication. The short-range communication technology may use Bluetooth, Bluetooth low energy (BLE), radio frequency identification (RFID), infrared data association (IrDA), ultra wideband (UWB), Zigbee, near field communication (NFC), or the like. The short-range communication module 115 may interwork with another external electronic device (for example, an external audio device) connected with the electronic device 100 via a network (for example, a short-range communication network) to transmit various data of the electronic device 100 to an external electronic device or receive data therefrom. The short-range communication module 115 may maintain an on state or may be turned on according to settings of the electronic device 100 or a user input.

The location calculation module 117 is a module for acquiring a location of the electronic device 100 and may include, for example, a global positioning system (GPS). The location calculation module 117 may measure the location of the electronic device 100 according to the principle of triangulation. For example, the location calculation module 117 may calculate distance information on distances from three or more base stations and time information and then may calculate current location information of three dimensions according to a latitude, a longitude, and an altitude by applying triangulation to the calculated information. Alternatively, the location calculation module 117 may calculate location information by continuously receiving the location information of the electronic device 100 from three or more satellites in real time. The location information of the electronic device 100 may be acquired in various methods.

The user input unit 120 may generate input data for controlling the operation of the electronic device 100 in response to a user input. The user input unit 120 may include at least one input module for detecting a user's various inputs. For example, the user input unit 120 may include a key pad, a dome switch, a physical button, a touch (capacitive/resistive), a jog & shuttle, and a sensor. According to one embodiment, the user input unit 120 may include an electronic pen (or a pen). According to one embodiment, the user input unit 120 may be implemented to receive an input of a force touch. The user input unit 120 may have a part thereof formed on the outside of the electronic device 100 in the form of a button, and a part or entirety of the user input unit 120 may be implemented as a touch panel. The user input unit 120 may receive a user input for initiating the operation of the electronic device 100 according to various embodiments of the present disclosure, and may generate an input signal according to a user input.

The touch screen 130 may indicate an input and output device performing an input function and a display function simultaneously, and may include a display 131, a touch sensor 133 and a fingerprint sensor 135. The touch screen 130 may provide an input and output interface between the electronic device 100 and the user, may transmit a user's touch input to the electronic device 100, and may serve as a medium to show an output from the electronic device 100 to the user. The touch screen 130 may show a visual output to the user. The visual output may be displayed in the form of a text, a graphic, a video and a combination thereof. According to an embodiment of the present disclosure, the touch screen 130 may display various screens according to operations of the electronic device 100 through the display 131. The touch screen 130 may detect an event (for example, a touch event, an approach event, a hovering event, or an air gesture event) based on at least one of a touch, hovering, or an air gesture from the user through the touch sensor 133, while displaying a specific screen through the display 131, and may transmit an input signal according to the event to the controller 180.

According to various embodiments of the present disclosure, the display 131 may display (output) various pieces of information processed by the electronic device 100. For example, when content including at least one object to be displayed is not associated with acquisition of fingerprint information, the display 131 may display at least one object at a predetermined location. When the content is associated with the acquisition of the fingerprint information, the display 131 may display a user interface or a graphical user interface (GUI) related to the operation of displaying at least one object in at least a partial area in which the fingerprint sensor 135 is formed.

The display 131 may support a screen display according to a landscape mode, a screen display according to a portrait mode, or a screen display according to a change between the landscape mode and the portrait mode according to a rotation direction (or a laying direction) of the electronic device 100. The display 131 may use various displays. According to various embodiments, the display 131 may use a bended display. For example, the display 131 may include a bended display which can be bended, crooked, or rolled without being damaged through a substrate which is thin or flexible like paper.

The bended display may be secured to a housing (for example, a main body) and may maintain a bended state. According to various embodiments, the electronic device 100 may be implemented by using a display device which can be freely bended or unbended like a flexible display in addition to the bended display. According to various embodiments, the display 131 may give flexibility to be able to be folded and unfolded by substituting a glass substrate enclosing liquid crystals with a plastic film in a liquid crystal display (LCD), a light emitting diode (LED) display, an organic LED (OLED) display, an active matrix OLED (AMOLED) display, or electronic paper. According to various embodiments, the display 131 may be extended to at least one side (at least one of a left side, a right side, an upper side, and a lower side) of the electronic device 100.

The touch sensor 133 may be seated in the display 131 and may detect a user input contacting or approaching the surface of the touch screen 130. According to an embodiment of the present disclosure, the touch sensor 133 may receive a user input for initiating an operation related to the use of the electronic device 100 and may generate an input signal according to a user input. The user input may include a touch event or an approach event which is inputted based on at least one of a single touch, a multi-touch, hovering, or an air gesture. For example, the user input may be inputted in a method of a tap, a drag, a sweep, a swipe, a flick, a drag & drop, or a drawing gesture (for example, hand writing or the like).

The fingerprint sensor 135 may include a fingerprint sensing unit configured to detect (or recognize) a fingerprint and arranged in a particular area corresponding to the display 131 or at a location corresponding to a plurality of areas or an entire area. One of an optical type, a capacitive type, and an ultrasonic type may be applied to the fingerprint sensor 135. The optical type fingerprint sensor may acquire a fingerprint by capturing an image of the fingerprint on the surface of the finger through photosensitive diodes. The capacitive type fingerprint sensor may acquire a fingerprint based on a principle that parts (ridges) of the fingerprint contacting an electrode are detected and parts (furrows) which do not contact the electrode are not detected. The ultrasonic type fingerprint sensor may acquire a fingerprint through generation of ultrasonic waves using piezo and a path difference of ultrasonic waves reflected from the ridges and the valleys of the fingerprint. The fingerprint sensor 135 according to various embodiments may have one of an in/on-cover glass structure, an over-display structure, an under-display structure, and an in-display structure.

For example, in/on-cover glass structure may be a structure in which a sensing unit or an electrode for sensing a fingerprint is arranged on the surface of a cover glass located on the display 131 through printing or etching in order to protect the display 131. The over-display structure may be a structure in which the sensing unit or the electrode for sensing the fingerprint is arranged on the display 131. The over-display structure may include the in/on-cover glass structure. The under-display structure may be a structure in which the sensing unit or the electrode for sensing the fingerprint is arranged below the display 131. The in-display structure may be a structure in which the sensing unit or the electrode for sensing the fingerprint is arranged inside the display 131 or in a black matrix area between pixels.

The audio processor 140 may transmit an audio signal which is received from the controller 180 to a speaker 141, and may transmit an audio signal which is received from a microphone 143, such as a voice, to the controller 180. The audio processor 140 may convert voice/sound data into an audible sound and output the audible sound through the speaker 141 under the control of the controller 180, and may convert an audio signal received from the microphone 143 such as a voice into a digital signal and may transmit the digital signal to the controller 180. The audio processor 140 may output an audio signal which responds to a user input according to audio processing information (for example, a sound effect, a music file, or the like) inserted into data.

The speaker 141 may output audio data which is received from the wireless communication unit 110 or stored in the memory 150. The speaker 141 may output an audio signal related to various operations (functions) performed in the electronic device 100. Although they are not shown in the embodiment of the present disclosure, the speaker 141 may have an attachable and detachable ear phone, a head phone, or a head set connected to the electronic device 100 through an external port.

The microphone 143 may receive an external audio signal and process it to electric voice data. Various noise reduction algorithms may be implemented to reduce a noise occurring in the process of the microphone 143 receiving the external audio signal. The microphone 143 may serve to input an audio stream such as a voice command (for example, a voice command for initiating a music application operation). The microphone 143 may include an internal microphone mounted in the electronic device 100 and an external microphone connected to the electronic device.

The memory 150 may store one or more programs executed by the controller 180, and may perform a function of temporarily storing inputted/outputted data. The inputted/outputted data may include files such as videos, images, photos, audios, or the like. The memory 150 may serve to store acquired data and data acquired in real time may be stored in a temporary storage device or data which is determined to be stored may be stored in a storage device which can store data for a long time.

According to various embodiments, the memory 150 may store instructions to cause the controller 180 (for example, one or more processors), when executed, to perform an operation of identifying content including at least one object to be displayed on the display 131 of the electronic device 100, an operation of, when the content is not associated with acquisition of fingerprint information, displaying the at least one object at a predetermined positions, and an operation of, when the content is associated with the acquisition of the fingerprint information, displaying the at least one object in at least the part of the display area in which the fingerprint sensor 135 is formed. The memory 150 may store a predetermined position of at least one object included in the content to be displayed on the display 131 of the electronic device 100 on a framework and store at least one piece of information selected from at least one piece of fingerprint information, at least one piece of user information (for example, a user identification (ID) and a password according to each web address), and at least one piece of payment information (for example, an account number or a card number).

The memory 150 may store various instructions that can be executed by the controller 180. The instructions may include control instructions such as arithmetical and logical operations, data transfer, and input/output that can be recognized by the controller 180 and may be defined on the framework stored in the memory 150. According to various embodiments, the memory 150 may store various screen resources associated with the fingerprint sensor 135. The screen resources may be stored on the framework.

The memory 150 may continuously or temporarily store an operating system (OS) of the electronic device 100, a program related to control of an input and a display using the touch screen 130, a program related to control of various operations (functions) of the electronic device 100, and various data generated by the operation of each program.

The memory 150 may include an extended memory (for example, an external memory) or an internal memory. The memory 150 may include a memory such as a flash memory type memory, a hard disk type memory, a micro type memory, and a card type memory (for example, a secure digital (SD) card or an eXtream digital (XD) card, and at least one type of storage medium from among a dynamic random access memory (DRAM), a static RAM (SRAM), a read only memory (ROM), a programmable ROM (PROM), an electrically erasable PROM (EEPROM), and a magnetic RAM (MRAM), a magnetic disk, and an optical disk. The electronic device 100 may operate in relation to a web storage which performs a storing function of the memory 150 on the Internet.

The memory 150 may store a variety of software. For example, the software element may include an OS software module, a communication software module, a graphic software module, a user interface software module, an MPEG module, a camera software module, one or more application software modules. In addition, since a module which is a software element may be expressed by a set of instructions, the module may be referred to as an instruction set. The module may also be referred to as a program.

The OS software module may include various software elements for controlling a normal system operation. Controlling the normal system operation may mean, for example, managing and controlling a memory, controlling and managing power, or the like. In addition, the OS software module may perform a function of smoothly communicating between various hardware (devices) and software elements (modules). The communication software module enables communication with another electronic device such as a computer, a server, or a mobile terminal through the wireless communication unit 110. In addition, the communication software module may be formed of a protocol structure corresponding to a corresponding communication method.

The graphic software module may include various software elements for providing and displaying graphics on the touch screen 130. The term "graphics" may be used to mean a text, a web page, an icon, a digital image, a video, an animation, or the like. The graphic software module may include various software elements related to a user interface. For example, the graphic software module may include information regarding how the state of a user interface is changed or in what condition the state of the user interface is changed.

The MPEG module may include a software element enabling a process and functions (for example, functions of generating, reproducing, distributing, and transmitting a content, or the like) related to a digital content (for example, a video, an audio). The camera software module may include a camera-related software element enabling a process and functions related to a camera. The application module may include a web browser including a rendering engine, an email, an instant message, word processing, keyboard emulation, an address book, a widget, digital right management (DRM), iris scan, context cognition, voice recognition, a location-based service, or the like. According to various embodiments, the application module may process operations (functions) of displaying a representative color of a selected cell while outputting a sound sample corresponding to the selected cell, and displaying a trace effect on a region between two cells.

The interface 160 may receive data from another external electronic device or may be supplied with power and transmit power to the respective elements of the electronic device 100. The interface 160 may transmit internal data of the electronic device 100 to another external electronic device. For example, a wired/wireless headphone port, an external charger port, a wire/wireless data port, a memory card port, an audio input/output port, a video input/output port, an earphone port, or the like may be included in the interface 160.

The camera module 170 may indicate an element supporting a photographing function of the electronic device 100. The camera module 170 may photograph a certain subject under the control of the controller 180 and transmit photographed data (for example, an image) to the display 131 and the controller 180. The camera module 170 may include one or more image sensors. For example, the camera module 170 may include a front sensor (for example, a front camera) provided on the front surface (for example, a surface which is coplanar with the display 131) and a rear sensor (for example, a rear camera) provided on the rear surface (for example, a bottom surface) of the electronic device 100.

A controller 180 may control the overall operation of the electronic device 100. For example, the controller 180 may perform various controls associated with music playback, voice communication, data communication, video communication, and the like. The controller 180 may be implemented by using one or more processors or the controller 180 may be referred to as a processor. For example, the controller 180 may include a CP, an AP, an interface (for example, a general purpose input/output (GPIO)), or an internal memory as separate elements, or may integrate them into one or more integrated circuits. The AP may perform various functions for the electronic device 100 by executing various software programs, and the CP may process and control voice communication and data communication. In addition, the controller 180 may execute a specific software module (an instruction set) stored in the memory 150 and perform various specific functions corresponding to the module.

According to various embodiments of the present disclosure, the controller 180 may identify content including at least one object to be displayed on the display 131 of the electronic device 100, when the content is not associated with acquisition of fingerprint information, display the at least one object at a predetermined positions, and when the content is associated with the acquisition of the fingerprint information, display the at least one object in at least the part of the display area in which the fingerprint sensor 135 is formed.

According to various embodiments, the controller 180 may control various operations related to normal functions of the electronic device 100 in addition to the above-described functions. For example, when a specific application is executed, the controller 180 may control a management of the application and a screen display. In addition, the controller 180 may receive an input signal corresponding to various touch event or approach event inputs supported by a touch-based or approach-based input interface (for example, the touch screen 130), and may control a function management according to the input signal. In addition, the controller 180 may control exchange of various data based on wire communication or wireless communication.

The power supply module 190 may be supplied with external power or internal power under the control of the controller 180, and may supply power utilized to perform operations of the respective elements. According to an embodiment of the present disclosure, the power supply module 190 may supply power or shut off the power supply to the display 131, the camera module 170, or the like under the control of the controller 180.

In addition, in some cases, embodiments described in the present specification may be implemented by the controller 180. In addition, according to software-based implementation, embodiments such as procedures and functions described in the present specification may be implemented by using separate software modules. Each of the software modules may perform one or more functions and operations described in the present specification.

FIGS. 2A to 2D illustrate a layer structure of an electronic device including a fingerprint sensor according to various embodiments of the present disclosure.

Figure 2A:
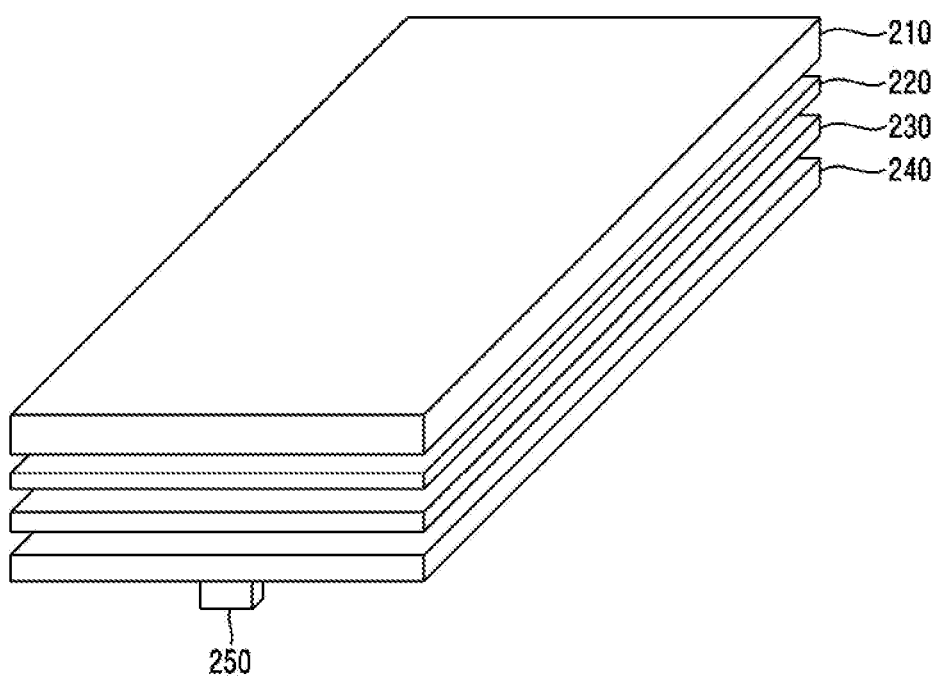
FIGS. 2A, 2B, 2C, and 2D illustrate a layer structure of an electronic device including a fingerprint sensor according to various embodiments of the present disclosure.

FIG. 2A illustrates a layer structure of an electronic device 200 including a fingerprint sensor 250.

Referring to FIG. 2A, a top direction may be a front direction of the electronic device 200 and a bottom direction may be a back direction of the electronic device 200, and respective elements may be included within a housing (not shown).

On a front surface of the housing, a cover window 210 may be formed. The cover window 210 may be formed with a transparent surface. The transparent surface is formed with a transparent material through which light penetrates and formed to protect a display 240 from external impact.

A touch sensor 220 and the display 240 may be formed below the cover window 210, and the cover window 210 and the display 240 (or the touch sensor 220) may adhere to each other by an optically clear adhesive (OCA) 230. Although FIG. 2A illustrates that the touch sensor 220 is located above the display 240, it is not limited thereto and may be implemented in various types such as an on-cell type, an in-cell type, and a layered type. For example, the in-cell type may be a type in which a fingerprint sensor is embedded in a display panel or a black matrix (BM) area, and the layered type may be a structure in which the fingerprint sensor is layered on or below the display panel.

The touch sensor 220 may detect a touch of an object (for example, a user's finger or a stylus) generated on the cover window 210.

Below the display 240 (or the touch sensor 220), the fingerprint sensor 250 may be located. When a user's finger is located on the cover window 210, the fingerprint sensor 250 may be formed to acquire user's fingerprint information. According to various embodiments, since the fingerprint sensor 250 is formed in an area on the rear surface of the display 240 or the touch sensor 220, the user may touch the display 240 or the touch sensor 220 with his/her finger in order to make his/her fingerprint recognized.

For example, the fingerprint sensor 250 may include an in/on-cover glass type corresponding to a structure in which the sensing unit or the electrode for sensing the fingerprint is arranged on the surface of the cover glass through printing or etching, an over-display type in which the sensing unit or the electrode is arranged on the display panel, an under-display type in which the sensing unit or the electrode is arranged below the display panel, and an in-display type in which the sensing unit or the electrode is arranged inside pixels of the display panel or in a BM area between pixels.

Further, the type of fingerprint sensor 250 is not limited by the following description. For example, the fingerprint sensor 250 may include an optical type for acquiring the fingerprint by capturing a fingerprint image on the surface of the finger through photosensitive diodes, a capacitive type for acquiring the fingerprint based on a principle that parts (ridges) of the fingerprint contacting the electrode are detected and parts (valleys) which do not contact the electrode are not detected, and an ultrasonic type for generating ultrasonic waves using piezo and acquiring the fingerprint through a path difference of ultrasonic waves reflected from the ridges and the valleys of the fingerprint.

Hereinafter, although the case in which the optical fingerprint sensor is arranged under the display 240 and the touch sensor 220 (under-display type) is representatively described, all the above-described various embodiments may be applied to the present disclosure.

Figure 2B:
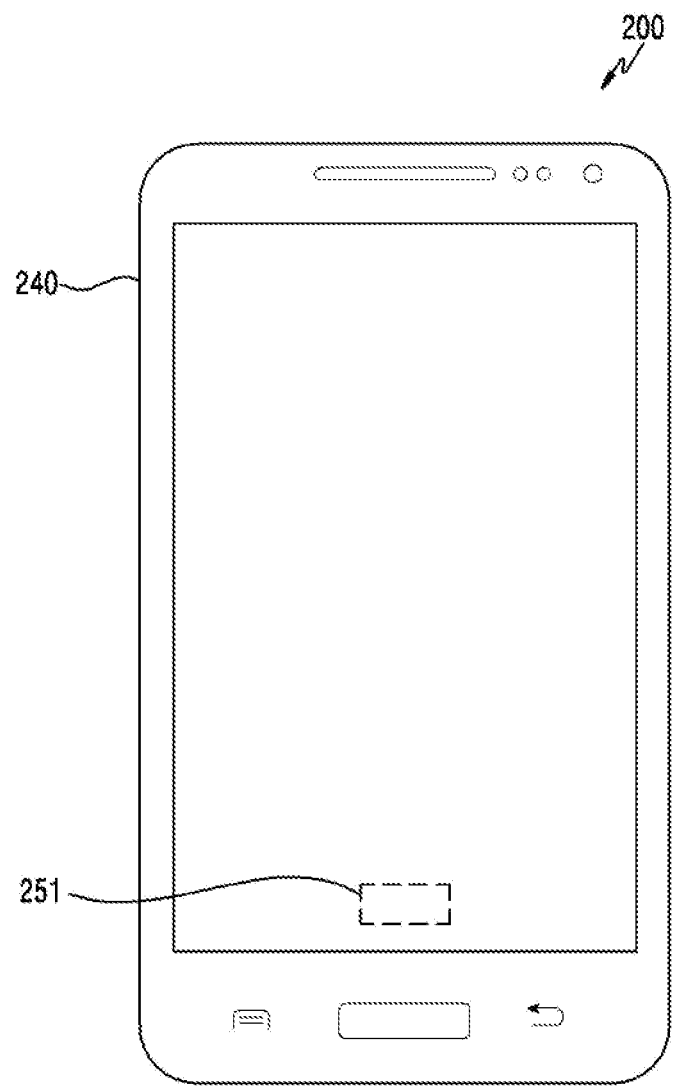

FIG. 2B illustrates an example of a fingerprint sensor located on a display of an electronic device according to various embodiments of the present disclosure.

As illustrated in FIG. 2B, the touch sensor may be formed on the rear surface of the display 240, and thus may not be visually recognized by the user. In this case, at least one area of the cover window, the OCA, the touch sensor, and the display 240 may include a transparent or a translucent area through which a predetermined amount or more of light penetrates, and the touch sensor may be arranged on the rear surface of the corresponding transparent or translucent area to acquire a user's fingerprint image. According to an embodiment, in at least one area of the display 240, the electronic device 200 may form a hole between pixels to enable a predetermined amount or more of light to penetrate therethrough. According to an embodiment, on a fingerprint sensing area 251 of the display 240, a user interface associated with a fingerprint recognition function may be displayed.

Figure 2C:
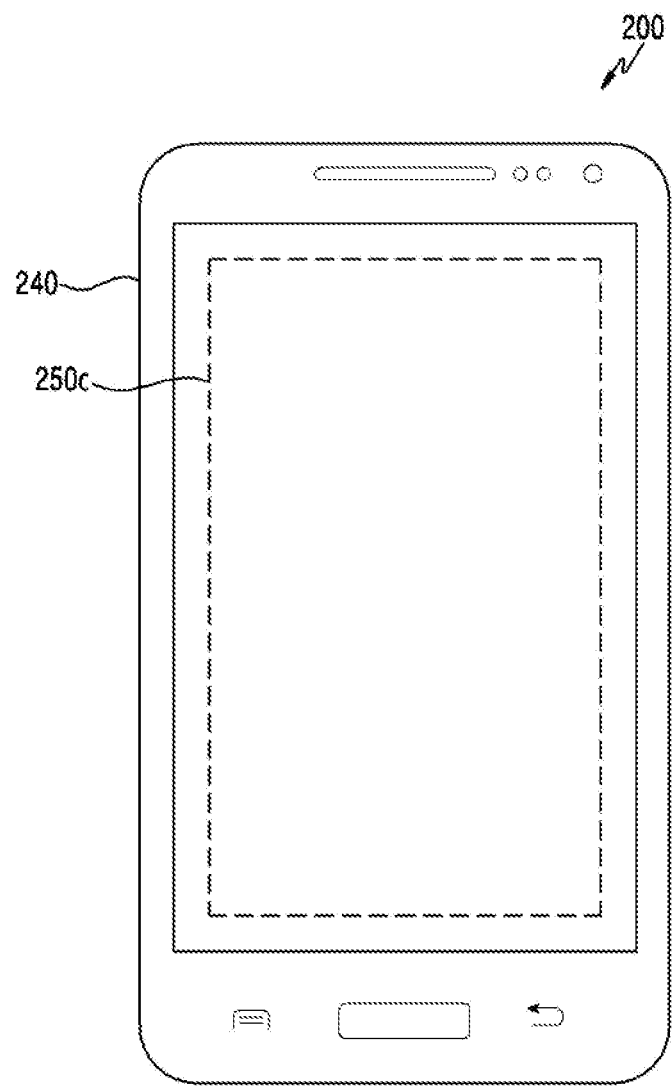
Figure 2D:
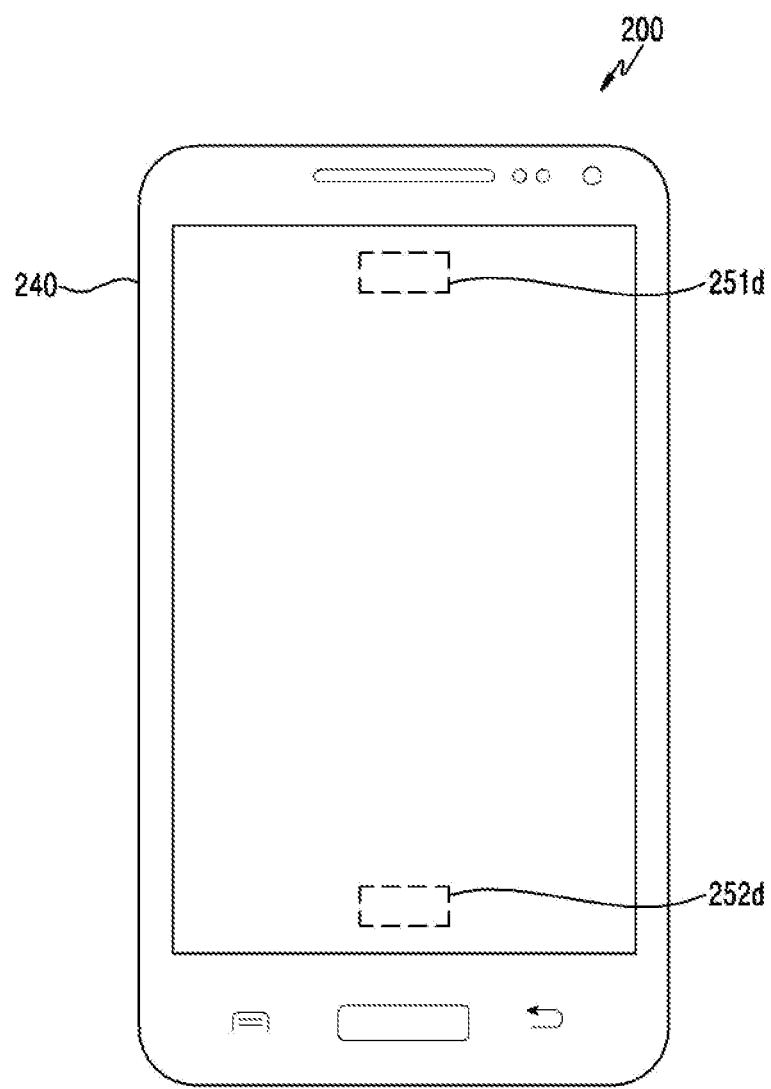

According to various embodiments, the size and/or the location of the fingerprint sensing area 251 is not limited. For example, the electronic device 200 may include a larger fingerprint sensing area 250c as illustrated in FIG. 2C. Further, according to another embodiment, the electronic device 200 may include two or more fingerprint sensors as illustrated in FIG. 2D, and fingerprint sensing areas 251d and 252d corresponding to the respective fingerprint sensors may be formed on the display 240.

As described above, the type, location, number, size, and density of the fingerprint sensors included in the electronic device 200 may vary, and the electronic device 200 may store and manage information related to the fingerprints. For example, the type of fingerprint sensor may be divided into an optical type, a capacitive type, and an ultrasonic type according to a sensing type and divided into a touch type and a sweep type according to an input type, and the electronic device 200 may store information on the type of fingerprint sensor included in the electronic device 200 among the listed types. The location of the fingerprint sensor may be defined as a coordinate value (for example, coordinate value on x and y axes of the display) or a mechanical location value (for example, front/rear/left/right/top/bottom), or a location value corresponding to a component (for example, a home key, a menu key, or a camera), the size of the fingerprint sensor may be defined by horizontal and vertical lengths, and the density (or dpi) may be defined as poor/fair/good/best.

According to various embodiments, the electronic device 200 may include at least one fingerprint sensor on the rear surface of the display 240. As described above, a display (display 240)-integrated fingerprint sensor may be supported by various sizes of screens and various sizes/densities of fingerprint sensors ranging from a small portable electronic device to a large TV. Further, the fingerprint sensor 250 may be located at various positions on the display 240 of the electronic device 200. In addition, the fingerprint sensor 250 may have various sensing types for acquiring the fingerprint. Accordingly, in order to execute the application using the fingerprint recognition function in various types of electronic device 200, a service should be provided at a position as accurately as possible on the screen through compatibility of the size of various screens and the type, position, size, and density of fingerprint sensor. In order to efficiently provide the user interface (UI)/user experience (UX) according to the related art considering only the size and the direction of the display 210, a method of storing and managing resources corresponding to the type, position, size, and density of the fingerprint sensor is required. Further, graphic processing for selecting a suitable image set from resources based on information on the type, position, size, and density of the fingerprint sensor included in the electronic device 200 and drawing the image set in an appropriate layout may be needed.

Figure 2E:
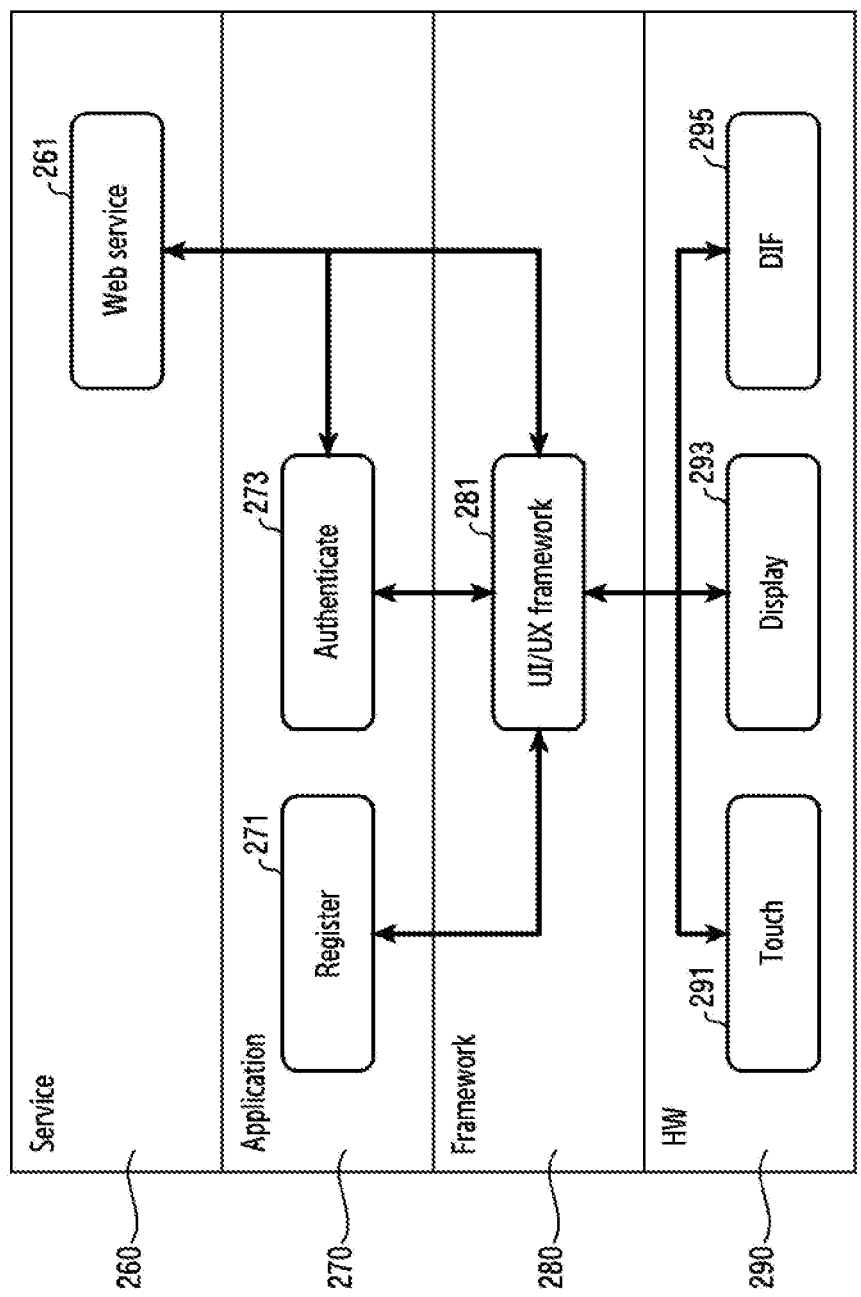
FIG. 2E illustrates an architecture of an electronic device according to various embodiments of the present disclosure.

FIG. 2E illustrates an architecture of an electronic device according to various embodiments of the present disclosure.

Referring to FIG. 2E, an architecture of the electronic device 200 may include software including a service 260, an application 270, and a framework 280, and hardware 290. The service 260 may provide various services (or functions) provided by the application 270, for example, a web service 261. The application 270 may refer to an application program installed in the electronic device 100. For example, the application 270 may include a home application, a dialer application, an short message service (SMS)/multimedia message service (MMS)/instant message (IM) application, a browser application, a camera application, an alarm application, a contact application, a voice dial application, an email application, a calendar application, a media player application, an album application, a clock application, a health care application (for example, measurement of exercise quantity or blood sugar), or an environmental information (for example, atmospheric pressure, humidity, or temperature information) provision application. Further, the application 270 may include an application associated with fingerprint registration 271 or fingerprint authentication 273.

The framework 280 corresponds to implementation of a detailed function of the application 270 by a user-made code, and may refer to a software platform. The framework 280 may provide a user interface and a user experience 281 associated with the application 270. The hardware 290 may include an electronic component and a mechanical component included in the electronic device 100. For example, the hardware 290 may include a touch 291 (e.g., a touch detecting unit), a display 293, and a display integrated fingerprint (DIF) 295. Further, the hardware 290 may further include elements such as a processor, a communication module, a camera module, a user input unit, and a memory.

Figure 3:
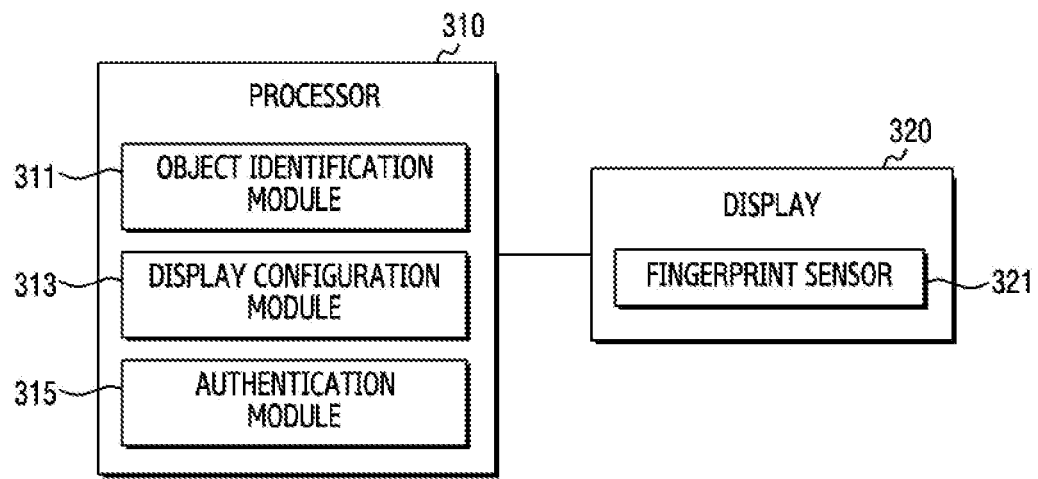
FIG. 3 illustrates a configuration of a processor of an electronic device according to various embodiments of the present disclosure.

FIG. 3 illustrates a configuration of a processor of an electronic device according to various embodiments of the present disclosure.

Referring to FIG. 3, the electronic device (for example, the electronic device 100) may include a processor 310 and a display 320. The processor 310 may be included in the controller 180 of FIG. 1. The processor 310 may include an object identification module 311, a display configuration module 313, and an authentication module 315. The display 320 may include a fingerprint sensor 321. The display 320 may be the touch screen 130 or the display 131 of FIG. 1.

The object identification module 311 may determine whether at least one object associated with acquisition of fingerprint information is included in objects (or a UI) displayed through the display 320. For example, when content is displayed on the display 320, the object identification module 311 may determine whether an object (for example, payment or login) that requires user authentication is included in objects constituting the content. When the object for user authentication is included, the display configuration module 313 may configure a page to display the object for the user authentication at a position where the fingerprint sensor 321 is arranged (or embedded) through the fingerprint sensor 321. The fingerprint sensor 321 may be included in some or all of the areas of the display 320. When the fingerprint sensor 321 is arranged at some areas of the display 320, the display configuration module 313 may move the object for the user authentication within the page to the position where the fingerprint sensor 321 is located. The display 320 may display the configured page. The authentication module 315 may detect a user input on the object for the user authentication and acquire fingerprint information from the detected user input through the fingerprint sensor 321. The authentication module 315 may perform user authentication based on the acquired fingerprint information.

According to various embodiments, the processor 310 may acquire screen resource information related to content. According to an embodiment, the content may be an execution of an application. The application may be an application manufactured by a $3^{rd}$ party, rather than the manufacturer of the electronic device 100, and may include a software development kit (SDK) including a header, a library, and other tools required for generating a user interface associated with a fingerprint recognition function.

The screen resource information may include resources such as an image, an animation, a menu, and a layout constituting the user interface associated with a fingerprint recognition function. According to an embodiment, the screen resource information may be stored on the framework, and the processor 310 may configure a user interface based on the screen resource information required by the application according to a call of the application. According to another embodiment, the screen resource information may be stored on the application, and the application may generate a user interface based on proper screen resource information with reference to attributes of the installed and executed electronic device 100.

According to an embodiment, the electronic device 100 may determine whether to use a user interface provided by the processor 310 as the user interface associated with the fingerprint sensor 321 based on attributes of the application. In other words, as described above, the processor 310 may generate the user interface from screen resource information of the framework when the application has application attributes that are determined to use the user interface provided by the processor 310, and the electronic device 100 may generate the user interface based on screen resource information defined on the application when the application is determined to directly generate the user interface at an application level. According to an embodiment, the memory 150 may store a white list of applications which can generate, by themselves, user interfaces based on screen resource information related to a fingerprint recognition function.

The electronic device 101 according to various embodiments may include the display 320, the fingerprint sensor 321 formed in at least a part of a display area of the display 320, and the processor 310, wherein the processor 310 may be configured to identify content including at least one object to be displayed on the display 320, when the content is not associated with acquisition of fingerprint information, display at least one object at a predetermined position, and when the content is associated with the acquisition of the fingerprint information, display at least one object in at least the part of the display area in which the fingerprint sensor is formed.

The processor 310 may be configured to delete at least one object from a predetermined position within the content and move the at least one object to a position at which the fingerprint sensor is formed.

The processor 310 may be configured to change attributes of the at least one object based on attribute information of the fingerprint sensor.

The processor 310 may be configured to detect a user input on the at least one object displayed at a position at which the fingerprint sensor is formed and recognize a fingerprint through the fingerprint sensor based on the user input.

When fingerprint authentication is completed, the processor 310 may be configured to perform a function associated with the at least one object.

The electronic device may further include a memory for storing a predetermined position of the at least one object on a framework and storing at least one piece of information selected from at least one piece of fingerprint information, at least one piece of user information, and at least one piece of payment information.

The processor 310 may be configured to determine whether a fingerprint acquired from a user matches the fingerprint information stored in the memory, and, when the fingerprint matches the fingerprint information, transmit the user information or the payment information to an external electronic device of the electronic device based on the at least one object.

The fingerprint sensor may be configured to be included in at least one of a partial area, a plurality of areas, or an entire area of the display 320.

The display 320 may be configured to be arranged at each of a front surface and a rear surface of the electronic device and fingerprint sensors having different fingerprint recognition rates are configured to be arranged at the front surface and the rear surface of the electronic device.

The processor 310 may be configured to select a fingerprint sensor to be used for fingerprint recognition based on a security level of the at least one object.

The processor 310 may be configured to maintain a user-authenticated state for a predetermined time after fingerprint authentication.

The processor 310 may be configured to acquire fingerprint data based on the user input while a continuous user input is detected, and perform fingerprint authentication according to whether the acquired fingerprint data matches a registered fingerprint.

The processor 310 may be configured to perform user authentication within a second application based on authenticated fingerprint information within a first application.

The processor 310 may be configured to perform user authentication within a second window based on authenticated fingerprint information within a first window of a multi-window.

The electronic device 100 according to various embodiments may include the display 320, the fingerprint sensor 321, and the processor 310 functionally connected to the display 320 or the fingerprint sensor 321, wherein the processor 310 may be configured to identify objects within content, determine whether there is an object for user authentication in the identified objects, and, when there is the object for user authentication in the content, move the object for user authentication to a position of the fingerprint sensor and display the moved object.

The electronic device 100 according to various embodiments may include the display 320, the fingerprint sensor 321, and the processor 310, wherein the processor 310 may be configured to identify at least one object included in a screen to be displayed through the display 320, determine whether one of the at least one object corresponds to an object for user authentication, when the one object does not correspond to the object for user authentication, display the one object in a first predetermined position, and, when the one object corresponds to the object for user authentication, display another object corresponding to the one object in a second predetermined position.

Figure 4A:
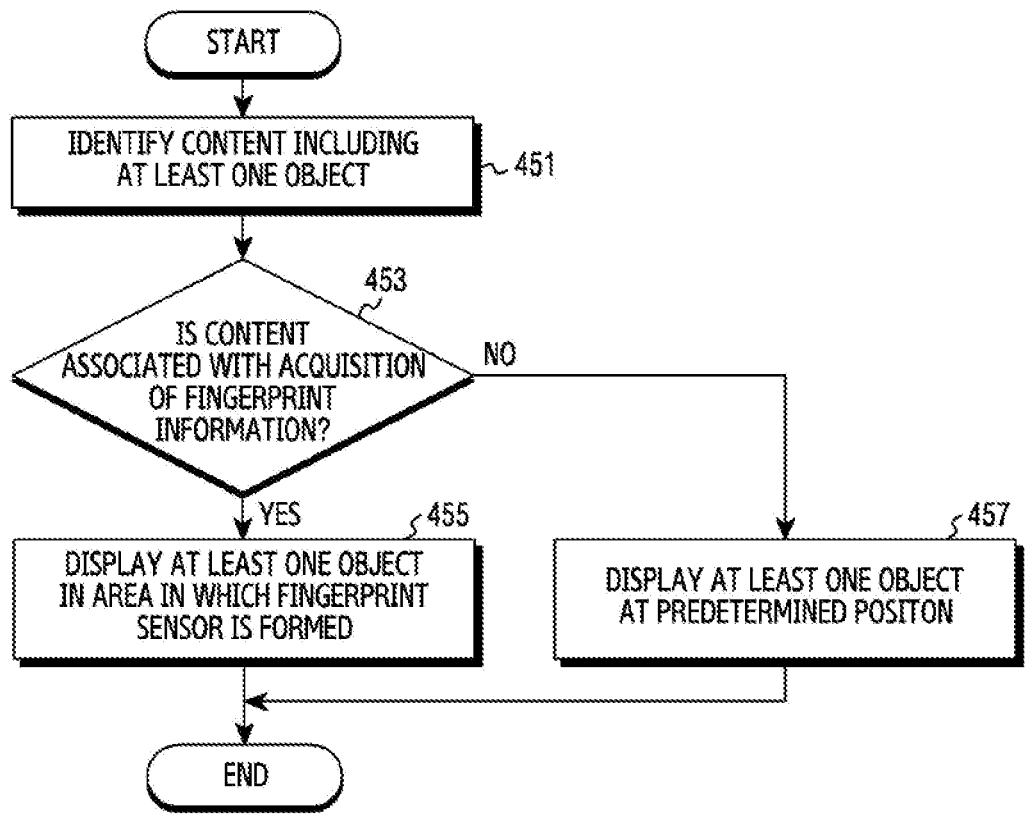
FIGS. 4A and 4B are flowcharts illustrating an operation method of an electronic device according to various embodiments of the present disclosure.

FIG. 4A is a flowchart illustrating an operation method of an electronic device according to various embodiments of the present disclosure.

Referring to FIG. 4A, in operation 451, the electronic device 100 (for example, the object identification module 311) may identify content including at least one object to be displayed on the display 320. The content may refer to a user interface or a user experience displayed on the display 320. For example, the content may be a page (for example, an execution screen of an application) consisting of at least one of text, an image, and a video.

In operation 453, the electronic device 100 (for example, the object identification module 311) may determine whether the content is associated with acquisition of fingerprint information. The content refers to a user interface and may include at least one object (for example, UI component). For example, at least one object may include a uniform resource locator (URL), a button (or a key), and an input item and may be selected by the user. Further, the content may further include an object (for example, a non-selectable object) having no reaction in spite of a user's selection.

The electronic device 100 may perform operation 455 when the content is associated with the acquisition of the fingerprint information, and perform operation 457 when the content is not associated with the acquisition of the fingerprint information.

In operation 455, the electronic device 100 (for example, the display configuration module 313) may perform control to display at least one object in at least some areas in which the fingerprint sensor (for example, the fingerprint sensor 321) is formed. For example, the display configuration module 313 may configure the content to display the object that requires user authentication at the position where the fingerprint sensor 321 is located (or embedded). The display configuration module 313 may configure the display such that another object corresponding to at least one object is displayed at a second predetermined position (for example, the position where the fingerprint sensor 321 is located). The display 320 may display content configured by the display configuration module 313.

In operation 457, the electronic device 100 (for example, the display configuration module 313) may perform control to display at least one object at a predetermined position. For example, the predetermined position may be determined by the framework stored in the memory (for example, 150). The display configuration module 313 may configure the display such that at least one object is displayed at a first predetermined position (for example, the original position to display the object within the content). The display 320 may display at least one object at the predetermined position.

Figure 4B:
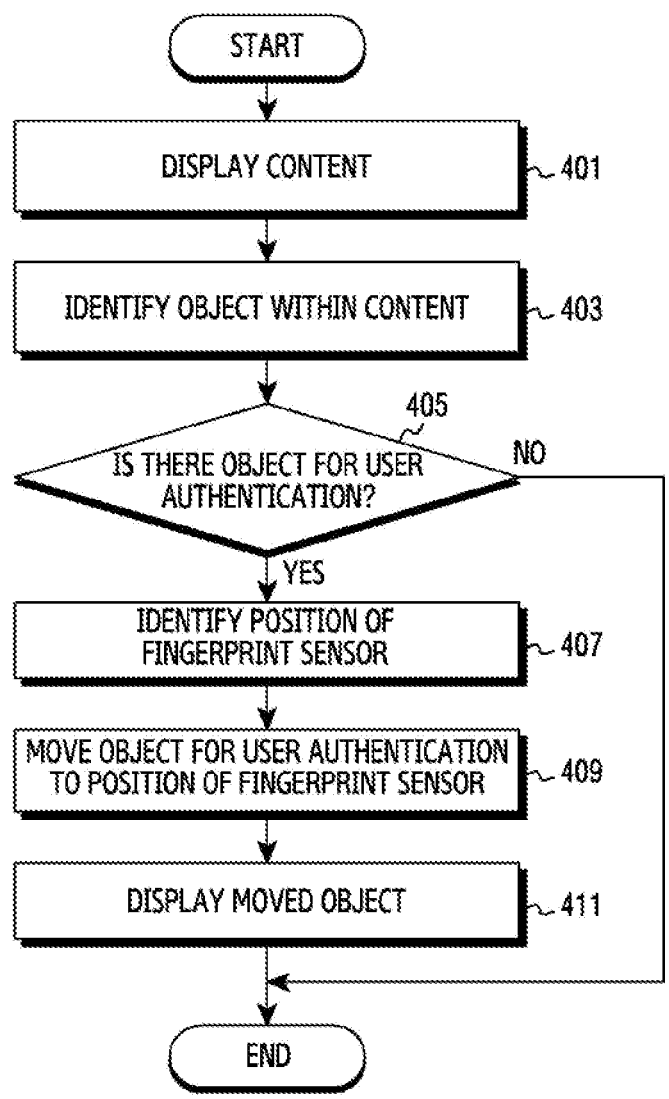

FIG. 4B is a flowchart illustrating an operation method of an electronic device according to various embodiments.

Referring to FIG. 4B, in operation 401, the electronic device 100 (for example, the display 320) may display content. The content may refer to a user interface or a user experience displayed on the display 320. For example, the content may be an execution screen of an application related to a text message, a call, a web, a game, and a payment.

In operation 403, the electronic device 100 (for example, the object identification module 311) may identify objects within the content. The object may refer to data such as a text, an image, or a video constituting the content. The object configures a user interface may be referred to as a UI component. For example, the object may include a URL, a button (or a key), and an input item and may be selected by the user. Further, the content may further include an object (for example, a non-selectable object) having no reaction in spite of a user's selection.

In operation 405, the electronic device 100 (for example, the object identification module 311) may determine whether an object for user authentication exists in the identified objects. For example, the object for the user authentication may refer to an object that performs the operation thereof after a service for identifying the user such as an account registration (for example, member joining) service, a login service, a payment service, or a financial service is performed. For example, when the user desires to post an article online, the electronic device 100 identifies user information such as a user ID and a password, and, only when the user information is correct (for example, the login is completed), the article can be posted. Alternatively, when the user purchases a product online, the user should input payment information (for example, an account number of a card number) required for paying for the product along with the user information of the user who purchases the product. The object for the user authentication may refer to an object that requires user information.

In operation 407, the electronic device 100 (for example, the display configuration module 313) may identify the location of the fingerprint sensor. The fingerprint sensor (for example, the fingerprint sensor 321) may include a fingerprint sensing unit configured to detect (or recognize) a fingerprint and arranged in some areas, a plurality areas, or an entire area corresponding to the display 320. In general, the fingerprint sensor may be provided at a home button of the electronic device 100, and the fingerprint sensor 321 may be arranged in a display area of the display 320. Even though the fingerprint sensor 321 is arranged in the display area of the display 320, the fingerprint sensor 321 may be arranged at a lower center of the display 320 in consideration that the fingerprint sensor 321 is provided at the home button. For example, the fingerprint sensor 321 may be arranged in some areas such as the top/bottom/left/right portion of the display 320, or a plurality of fingerprint sensors may be arranged in a plurality of areas, respectively, or in an entire area of the display 320. Hereinafter, although it is described that the fingerprint sensor is arranged at the lower center of the display 320, the location of the fingerprint sensor is not limited by the following description.

In operation 409, the electronic device 100 (for example, the display configuration module 313) may move the location of the object for the user authentication to the position of the fingerprint sensor 321. For example, the location of the fingerprint sensor 321 is the lower center of the display 320, and the object for the user authentication may be arranged at an upper right side of the display 320. The display configuration module 313 may move the object for the user authentication to the lower center from the upper right side.

The display configuration module 313 according to various embodiments may delete the original object for user authentication when the object for user authentication moves. Alternatively, the display configuration module 313 may maintain the original object for user authentication without deleting it when the object for user authentication moves.

The display configuration module 313 according to various embodiments may change attributes of the object for user authentication based on attribute information of the fingerprint sensor. For example, the attribute information of the fingerprint sensor may include at least one of a size, a position, a shape, and a density of the fingerprint sensor. The display configuration module 313 may change at least one of a size, a position, a shape, and a color of the object for user authentication based on the attribute information of the fingerprint sensor 321.

In operation 411, the electronic device 100 (for example, the display 320) may display the moved object. For example, the display 320 may display changed content in which the object for user authentication within the content is moved to the position of the fingerprint sensor by the display configuration module 313. The content displayed in operation 401 may be the original content, and the content displayed in operation 411 may be the changed content. That is, the changed content may be content in which the position of the object of the original content is moved.

According to various embodiments, the fingerprint sensor 321 may recognize the fingerprint based on a user input by the user for selecting the object for user authentication in the content displayed in operation 411. The user may make a user input (for example, a touch input) on the object for user authentication. The fingerprint sensor 321 may acquire the fingerprint when the user presses the displayed object. The authentication module 315 may determine whether the acquired fingerprint matches the fingerprint registered (or stored) in the memory 150. When the fingerprints match each other, the authentication module 315 may perform user authentication based on user information stored in the memory 150.

According to various embodiments, the memory 150 may store at least one piece of fingerprint information, at least one piece of user information, and at least one piece of payment information. The user information may include a user ID and a password according to each web address. For example, a user ID and a password of a web address "A" and a user ID and a password of a web address "B" may be stored in the memory 150 as the user information by the user input. The payment information may include at least one of an account number for each band, a depositor name, and a password. The payment information may include at least one of a card number for each card, an expiration date, and a password.

When the object for user authentication detected in operation 405 is associated with a login, the processor 310 may extract user information of the logged-in web address from the memory 150 and transmit the extracted user information to an external electronic device (for example, a POS device or a web server). According to various embodiments, the user may perform a login based on user information stored in the memory 150 through fingerprint recognition by a user input of pressing a login button along without directly inputting a user ID and a password required for the login. When the object for user authentication detected in operation 405 is associated with payment, the processor 310 may extract payment information of a product to be paid for from the memory 150 and transmit the extracted payment information to an external electronic device (for example, a POS device or a web server). According to various embodiments, the user may pay for the product based on payment information stored in the memory 150 through fingerprint recognition by a user input of pressing a payment button without directly inputting a card number, an expiration date, or a password required for the payment.

According to various embodiments, although it has been described that the original content is displayed (for example, operation 401) and then the changed content in which the object is moved is displayed (for example, operation 411), the changed content may be displayed by moving the object before the original content is displayed. That is, operation 401 can be omitted.

Figure 5A:
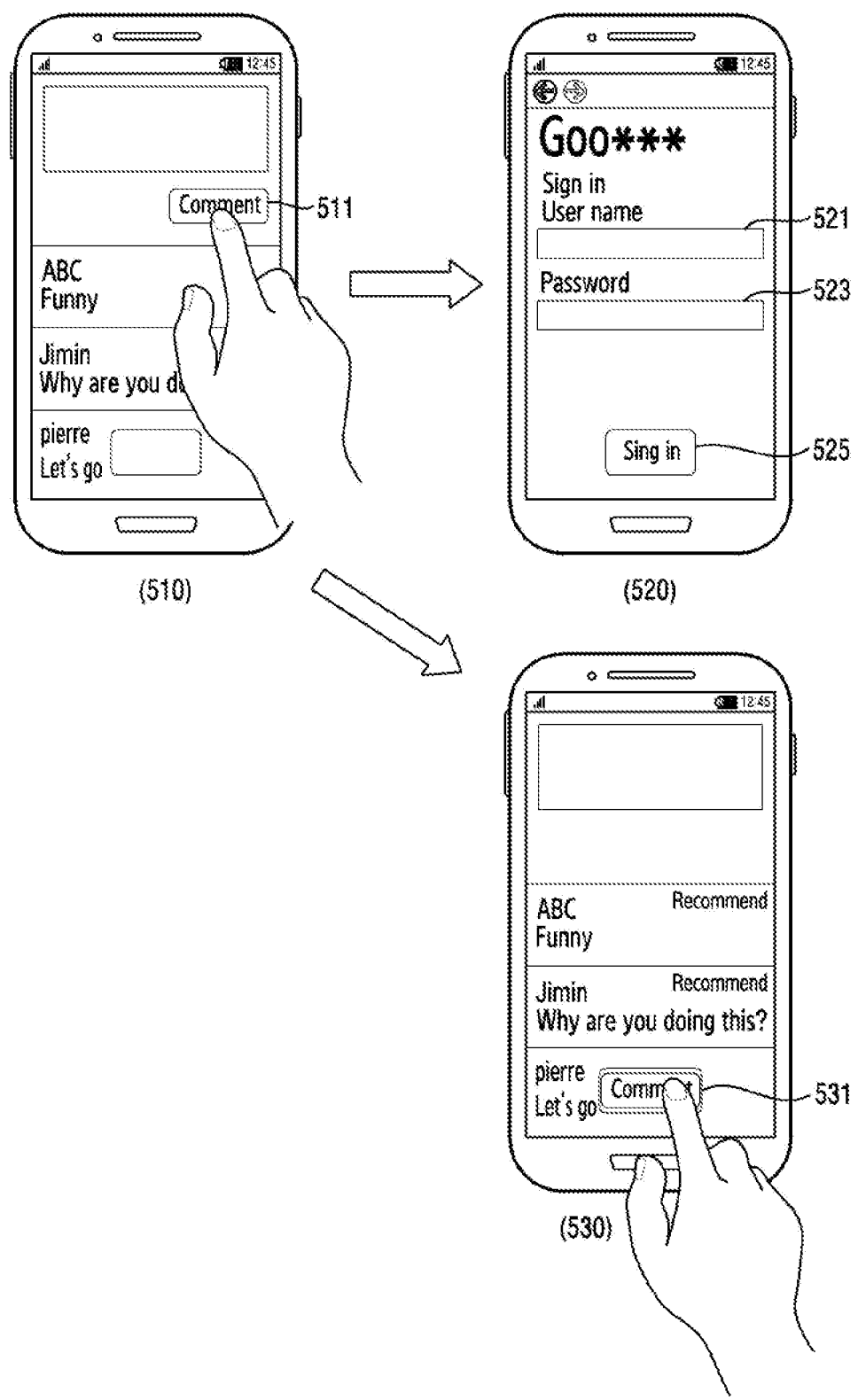
FIGS. 5A and 5B illustrate examples of displaying a user interface according to various embodiments of the present disclosure.
Figure 5B:
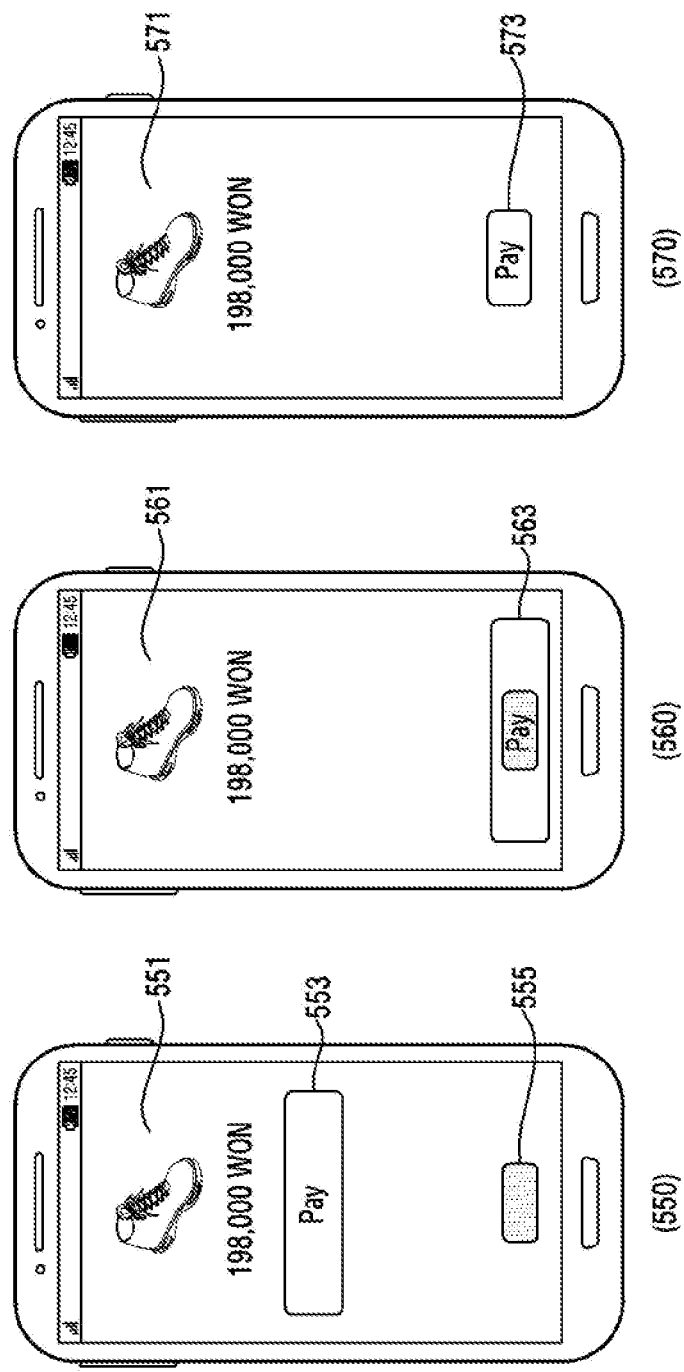

FIGS. 5A and 5B illustrate examples of displaying a user interface according to various embodiments of the present disclosure.

FIG. 5A illustrates an example of changing and displaying a user interface associated with login.

Referring to FIG. 5A, the electronic device 100 (for example, the controller 180) may display a page 510 associated with a social network service. The page 510 may be a screen of a user interface associated with the social network service. The user may post his/her own article by selecting a particular object (for example, a comment button 511) within the page 510. In order to post the article, a login process for inputting a user ID and password may be necessary. In general, when the comment button 511 is selected on the page 510, the controller 180 may display a login page 520.

The login page 520 may include a user name (or ID) input item 521, a password input item 523, and a login button 525. The user may place the cursor on the user name input item 521 to input the user name and place the cursor on the password input item 523 to input the password, and, when the user name and the password are completely input, may select the login button 525. When the user selects the user name input item 521, the controller 180 may place the cursor and provide a keypad. When the user selects the password input item 523, the controller 180 may place the cursor and provide a keypad. That is, the user needs many selections and inputs in order to input user information (for example, the user name and the password).

When an object (for example, the comment button 511) for user authentication is included within the page 510 based on resource information of the page 510, the electronic device 100 (for example, the controller 180) according to various embodiments may display a page 530 in which the comment button 511 is moved to the position of the fingerprint sensor. Hereinafter, for convenience of description, the page 510 may be referred to as an original page 510, and the page 530 may be referred to as a changed page 530. The changed page 530 may be similar to the original page 510 with the only difference being position of the object for the user authentication. The controller 180 may detect a user input for selecting the comment button 531 within the changed page 530, perform fingerprint authentication based on the user input, and, when the fingerprint authentication is successful, perform a function corresponding to the comment button 531.

For example, the controller 180 may acquire the fingerprint based on the user input and determine whether the acquired fingerprint matches the registered fingerprint (for example, fingerprint recognition). When the acquired fingerprint matches the registered fingerprint, the controller 180 may extract user information required for login from the memory 150 and transmit the extracted user information to a web server associated with the social network service. The web server may receive the user information, and, when the received user information matches user information stored in the web server, allow the login. Accordingly, the user may log in to the social network service based on the transmitted user information without directly inputting the user ID and the password required for login. When the login is completed, the controller 180 may receive a page to write article from the web server and display the page.

In the related art, when the user selects the comment button 511 on the original page 510, the electronic device may provide a login page 520, and, only when user information input on the login page 520 is correct, provide the page to write the article. According to an embodiment of the present disclosure, the page to write the article may be directly displayed from the original page 510 or the changed page 530 through fingerprint recognition without displaying the login page 520.

FIG. 5B illustrates an example of changing and displaying a user interface associated with payment.

Referring to FIG. 5B, the electronic device 100 (for example, the controller 180) may display a page 550 associated with product purchase. The page 550 may be a screen of a user interface related to a product purchase page including product information 551 and a payment button 553. Further, the controller 180 may display a location 555 of the fingerprint sensor within the page 550. The user may purchase the product by selecting the payment button 553 within the page 550. In order to purchase the product, a login process or a payment process may be necessary. In general, when the payment button 553 is selected on the page 550, the controller 180 may display a login page (for example, the login page 520) or a payment page. When the payment button 553 is selected in the login state, a payment page for inputting a card number, an expiration date, and a password may be displayed.

When an object (for example, the payment button 553) for user authentication is included within the page 550 based on resource information of the page 550, the electronic device 100 (for example, the controller 180) according to various embodiments may display a page 560 or a page 570 on which the payment button 553 is moved to the position of the fingerprint sensor. Hereinafter, for convenience of description, the page 550 may be referred to as a first page 550, the page 560 may be referred to as a second page 560, and the page 570 may be referred to as a third page 570. The second page 560 and the third page 570 may be similar to the first page 550 with only difference in the location of the object for the user authentication. The second page 560 may include product information 561 and a payment button 563 which is the same as the payment button 553 on the first page 550 with only difference in the location thereof. The controller 180 may change attributes of the object for user authentication based on attribute information of the fingerprint sensor. The third page 570 may include product information 571 and a payment button, the size of which is changed from the payment button 553 on the first page 550 to be similar to attributes of the fingerprint sensor. That is, the payment button 573 on the third page 570 may be changed to have the size similar to the size of the fingerprint sensor and to be smaller than the payment button 553 on the first page 550.

According to an embodiment, the fingerprint sensor 135 corresponds to an optical fingerprint sensor and may be arranged in a structure of being layered with the display 131. The optical fingerprint sensor corresponds to a light emitting unit and may use a light source of the display 131. The light source from the display 131 may be reflected from the user's finger and penetrate the display 131 so as to enter a receiving unit of the optical fingerprint sensor. The controller 180 may change the light source from the display 131 to have a predetermined color (for example, green or white) in order to improve a recognition rate of the fingerprint image acquired by the fingerprint sensor 135. Accordingly, the controller 180 may change the color of the payment button 573 on the third page 570 into the predetermined color and display the changed payment button 573. Alternatively, the controller 180 may change the color of at least some areas of the payment button 573 into the predetermined color in response to a user input (for example, a touch input on the payment button 573) and display the changed payment button 573.

The controller 180 may detect a user input for selecting the payment button on the second page 560 or the third page 570, perform fingerprint authentication based on the user input, and, when the fingerprint authentication is successful, perform a function corresponding to the payment button. For example, the controller 180 may acquire the fingerprint based on the user input and determine whether the acquired fingerprint matches the registered fingerprint (for example, fingerprint recognition). When the acquired fingerprint matches the registered fingerprint, the controller 180 may extract payment information required for payment from the memory 150 and transmit the extracted payment information to a payment server. The payment server may receive the payment information, and, when the received payment information is effective, allow the payment. Accordingly, the user may purchase the product based on the transmitted payment information without directly inputting a card number, an expiration date, and a password required for the payment.

When the payment is approved, the controller 180 may receive a payment completion page from a web server associated with product purchase and display the payment completion page.

In the related art, when the user selects the payment button 553 on the first page 550, the electronic device may provide a login page or a payment page, perform user authentication (for example, fingerprint authentication or login), and, only when the input payment information within the payment page is correct, provide a payment completion page. According to an embodiment of the present disclosure, a payment function may be performed along with the user authentication directly on the second page 560 or the third page 570 without displaying a separate user authentication (fingerprint authentication or login) screen (or page).

FIGS. 6A to 6E illustrate examples of configuring a user interface according to various embodiments of the present disclosure.

Figure 6A:
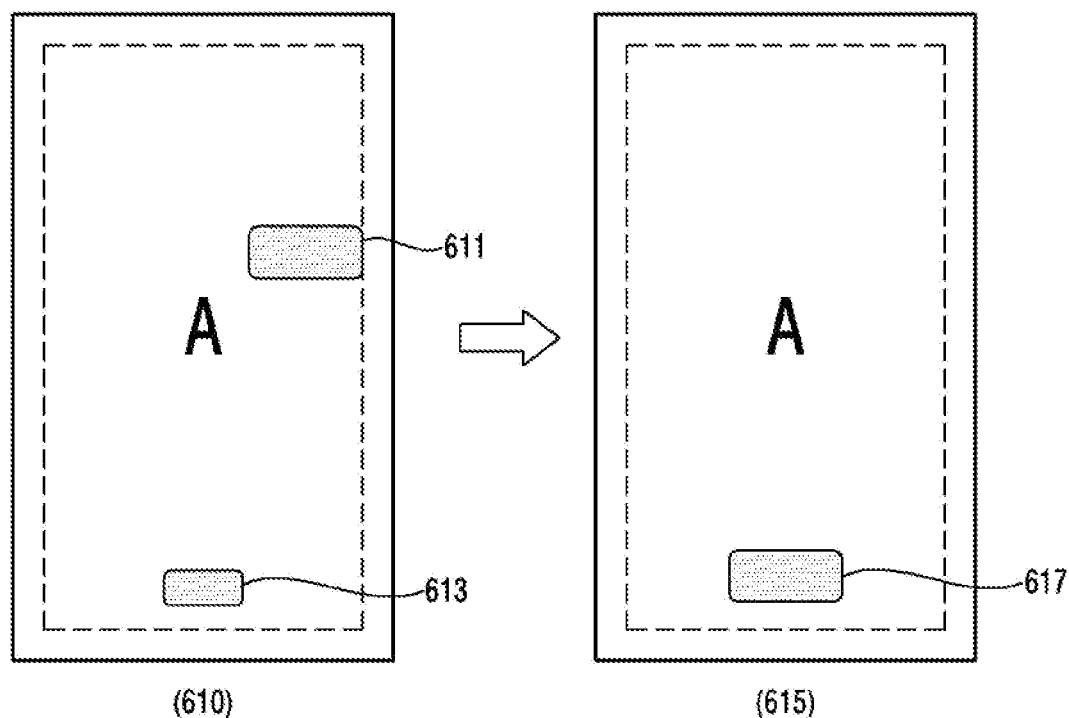
FIGS. 6A, 6B, 6C, 6D, and 6E illustrate examples of configuring a user interface according to various embodiments of the present disclosure.

FIG. 6A illustrates an example of changing a location of an object for user authentication.

Referring to FIG. 6A, when an object 611 for user authentication is included within an original page 610, the electronic device 100 (for example, the controller 180) may move the object 611 of the user authentication to a position 613 corresponding to (for example, a position where a fingerprint sensor is arranged or installed) a fingerprint sensor (for example, the fingerprint sensor 135) and display the object 611. The controller 180 may configure a page 615 on which the original object 611 for the user authentication is deleted and an object 617 for user authentication is moved to the position of the fingerprint sensor. That is, as the controller 180 overlays the object 617 for the user authentication on the position of the fingerprint sensor, the object 617 for the user authentication may be overlaid on other objects arranged at the position of the fingerprint sensor.

Figure 6B:
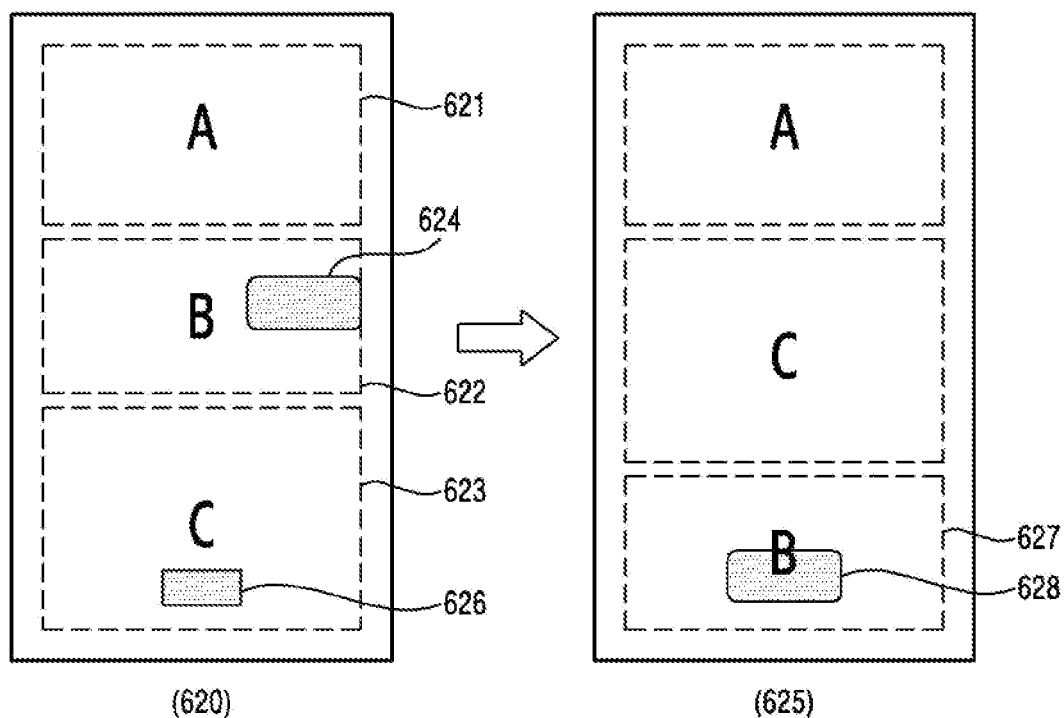

FIG. 6B illustrates an example of changing a position of an area including the object for user authentication.

Referring to FIG. 6B, the electronic device 100 (for example, the controller 180) may analyze that an original page 620 includes an area A 621 (or a layer A), an area B 622, and an area C 623. The controller 180 may analyze the original page 620 by parsing a code configuring the original page 620. The controller 180 may identify that an object 624 for user authentication is included in the area B 622 on the original page 620 and a fingerprint sensor 626 is arranged in the area C 623 on the original page 620. The controller 180 may switch the area B 622 including the object 624 for the user authentication and the area C 623 in which the fingerprint sensor 626 is arranged. For example, the controller 180 may move the area B 622 including the object 624 for the user authentication to the position where the fingerprint sensor 626 is arranged, and move the area C 623 in which the fingerprint sensor 626 is arranged to the original area B 622. That is, the controller 180 may configure a page 625 on which the area B 627 is moved to the area in which the fingerprint sensor is arranged and the position of the object 628 for user authentication included in the area B 627 is moved to the position in which the fingerprint sensor is arranged. The controller 180 may reconfigure objects included in the area B 627 and move the position of the object 628 for user authentication to the position at which the fingerprint sensor is arranged.

Figure 6C:
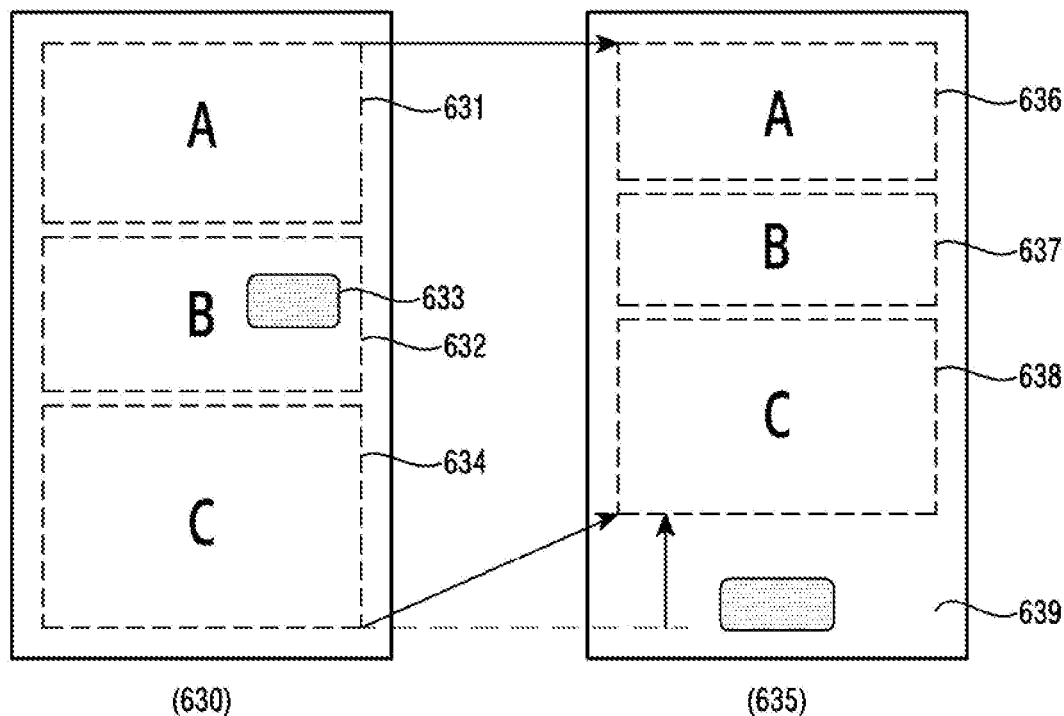

FIG. 6C illustrates an example of reducing an area within a page and changing a position of an object for user authentication.

Referring to FIG. 6C, the electronic device 100 (for example, the controller 180) may analyze that an original page 630 includes an area A 631 (or a layer A), an area B 632, and an area C 634. The controller 180 may determine that an object 633 for user authentication is included in the area B 632 of the original page 630. The controller 180 may reduce a size of an area constituting the original page 630. For example, the controller 180 may configure a page 635 on which the position of the object 633 for the user authentication is moved to the position at which the fingerprint sensor is arranged and the sizes of the area A 636, the area B 637, and the area C 638 are reduced. A background color or a style of a margin area 639 may be determined based on a background color or a style of the area A 636, the area B 637, or the area C 638. Accordingly, the margin area 639 may be displayed through the display 131 such that the user does not sense a difference.

Figure 6D:
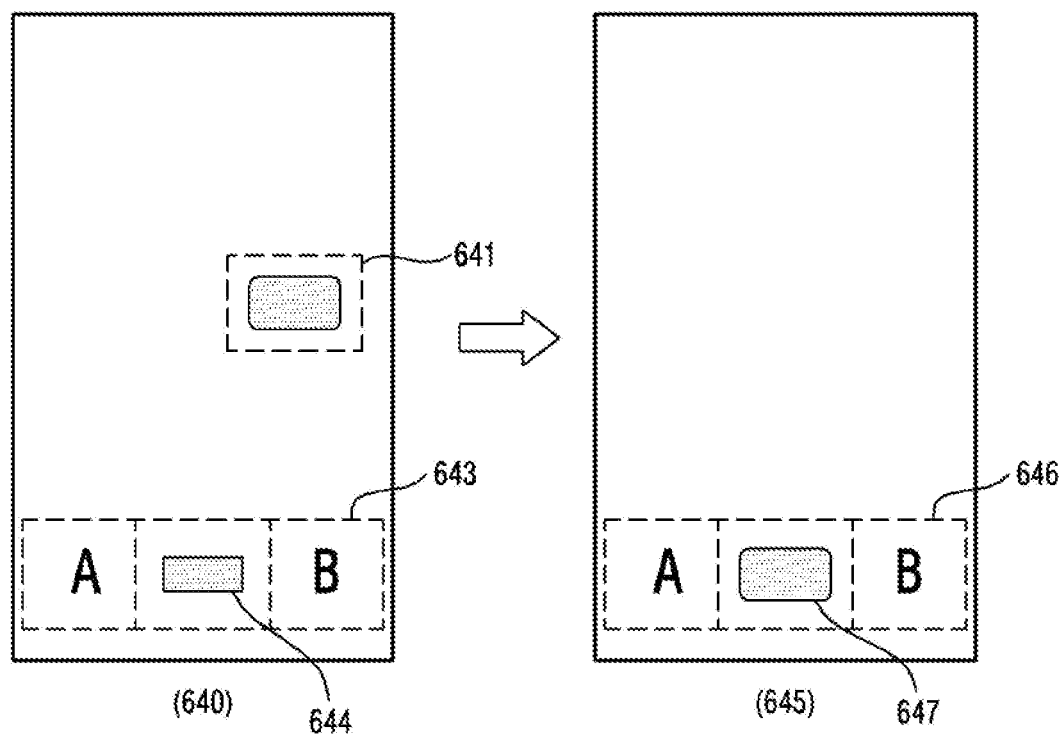

FIG. 6D illustrates an example of preparing an area of a position at which the fingerprint sensor is arranged and changing a location of an object for user authentication.

Referring to FIG. 6D, the electronic device 100 (for example, the controller 180) may prepare an area 643 of a position 644 at which the fingerprint sensor is arranged on an original page 640. The controller 180 may determine whether an object 641 for user authentication is included within the original page 640. When the object 641 for the user authentication is included within the original page 640, the controller 180 may move the object 641 for the user authentication to the position 644 at which the prepared fingerprint sensor is arranged. For example, the controller 180 may configure a page 645 including an area 646 on which the position of the object 647 for user authentication is moved to the position at which the fingerprint sensor is arranged.

Figure 6E:
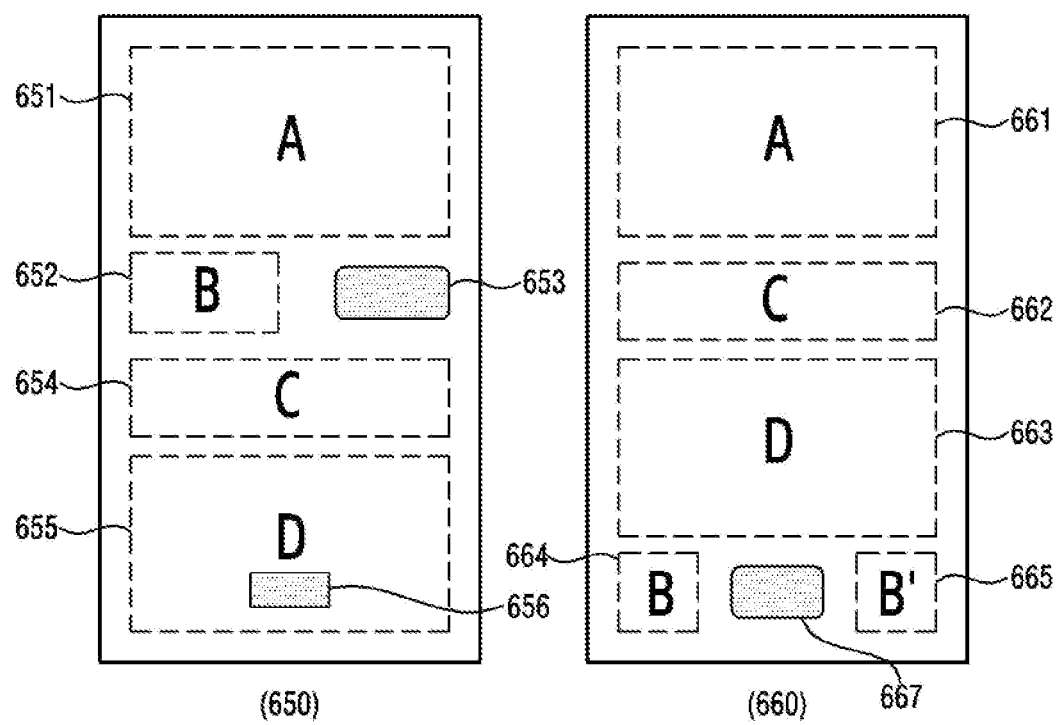

FIG. 6E illustrates an example of selecting proper resources from multiple resources and changing a location of an object for user authentication.

Referring to FIG. 6E, the electronic device 100 (for example, the controller 180) may analyze that an original page 650 includes an area A 651, an area B 652, an area C 654, and an area D 655. Further, the controller 180 may identify that an object 653 for user authentication is included near the area B 652 and a fingerprint sensor 656 is arranged within the area D 655. The controller 180 may reconfigure some areas of the original page 650 based on the position at which the fingerprint sensor 656 is arranged and screen resource information configuring the original page 650 stored on the framework. For example, the controller 180 may move the area B 652 close to the object 653 for user authentication to the position at which the fingerprint sensor is arranged and move the area C 654 and the area D 655 upward. Further, the controller 180 may reconfigure the area B 652 to move the object 653 for user authentication to the position at which the fingerprint sensor is arranged.

The controller 180 may configure a page 660 on which the object 667 for user authentication is moved to the position at which the fingerprint sensor is arranged and the area B 652 is reconfigured as an area B 664 and an area B' 665. Through comparison of the changed page 660 with the original page 650, it may be noted that the positions of the area C 662 and the area D 663 except for the area A 661 are moved and the area B 652 is reconfigured as the area B 664 and the area B' 665.

Figure 7:
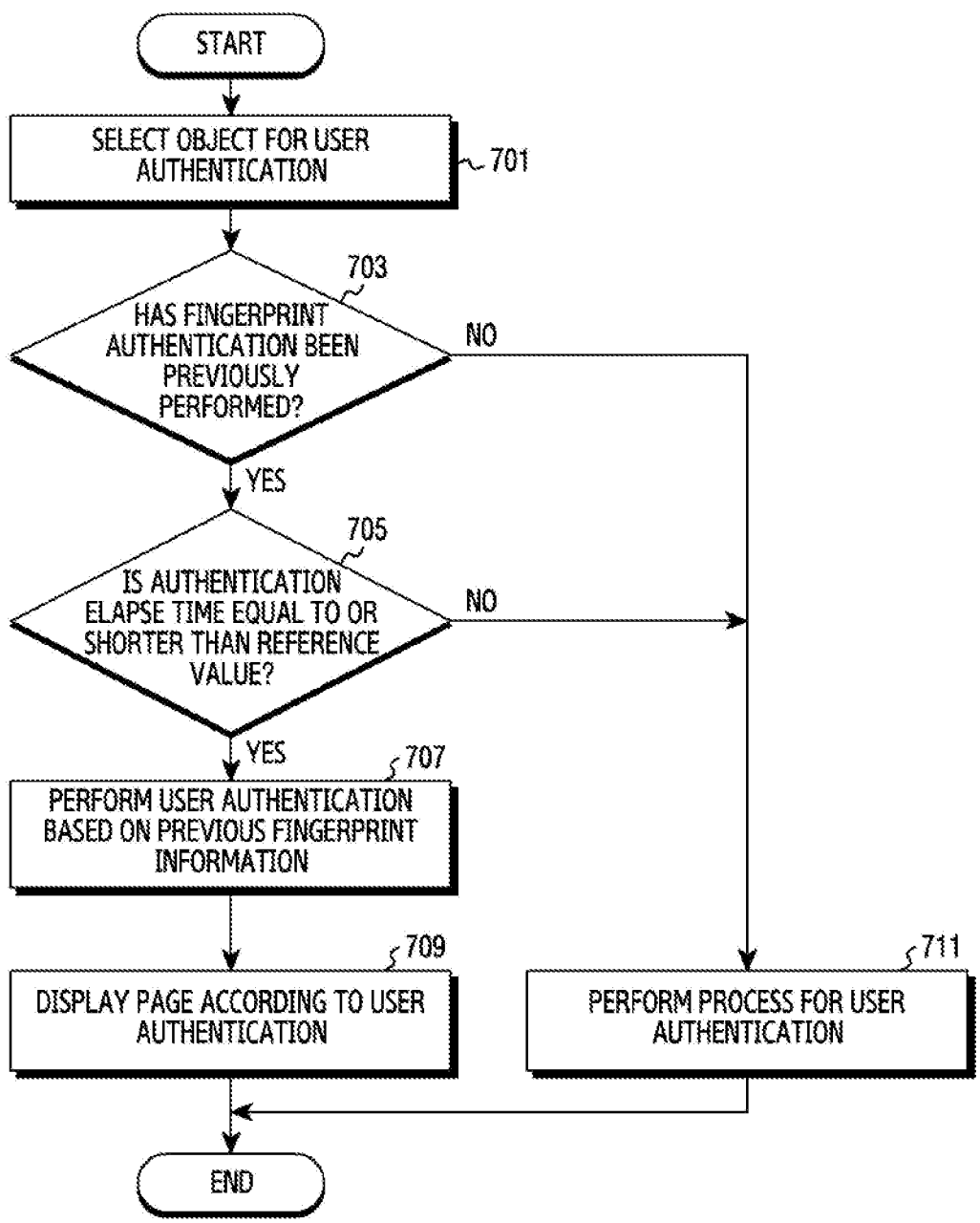
FIG. 7 is a flowchart illustrating a method of performing user authentication by an electronic device according to various embodiments of the present disclosure.

FIG. 7 is a flowchart illustrating a method of performing user authentication by an electronic device according to various embodiments of the present disclosure.

Referring to FIG. 7, in operation 701, the electronic device 100 (for example, the controller 180) may select an object for user authentication. When a user input for selecting (or touching) the object for user authentication is detected, the controller 180 may determine that the object for user authentication is selected. The object for user authentication may include an object associated with an account registration service, a login service, a payment service, or a financial service.

In operation 703, the electronic device 100 (for example, the controller 180) may determine whether fingerprint authentication has been previously performed. The controller 180 may determine whether fingerprint authentication has been performed at least once before the object is selected. The fingerprint authentication may correspond to acquiring the fingerprint from the user and determining whether the acquired fingerprint matches the registered fingerprint. For example, the user may unlock the electronic device 100 through the fingerprint authentication and execute a desired function (or application). In this case, the controller 180 may determine that the fingerprint authentication according to the unlocking of the electronic device 100 has been performed.

The controller 180 may perform operation 705 when the fingerprint authentication has been previously performed, and perform operation 711 when the fingerprint authentication has not been previously performed.

In operation 705, the electronic device 100 (for example, the controller 180) may determine whether an authentication elapse time is equal to or shorter than a reference value. The controller 180 according to various embodiments may maintain an authentication state for a predetermined time after the fingerprint authentication. The controller 180 may guide an indicator related to the authentication state. For example, the controller 180 may display the authentication state in an indicator area, change and display a color related to the authentication state, or display a timer for an authentication time. The indicator area may be an area for displaying various pieces of information (for example, signal strength, amount of battery, and time) related to the electronic device 100.

For example, when the user makes a request for user authentication again within a reference value (for example, 5 minutes or 10 minutes) after the fingerprint authentication, the controller 180 may perform the user authentication based on the previously authenticated fingerprint information without separate fingerprint authentication. However, when the user makes a request for user authentication after a reference value (for example, 1 hour) passes after the user authentication, the controller 180 may make a request for re-authentication.

The controller 180 may perform operation 707 when the authentication elapse time is equal to or shorter than the reference value, and perform operation 711 when the authentication elapse time is longer than the reference value.

In operation 707, the electronic device 100 (for example, the controller 180) may perform user authentication based on previous fingerprint information. For example, the electronic device 100 may recognize the fingerprint based on the fingerprint used when the electronic device 100 was unlocked. Alternatively, the electronic device 100 may recognize the fingerprint based on the fingerprint previously acquired when the user selects the object for the user authentication.

In operation 709, the electronic device 100 (for example, the controller 180) may display a page according to user authentication. For example, the controller 180 may perform a function corresponding to the object for user authentication displayed in operation 701. When the object for user authentication is a login button, the controller 180 may transmit user information required for the login to a web server to perform the login and display a page provided after the login is completed. When the object for user authentication is a payment button, the controller 180 may transmit payment information required for payment to a server to perform the payment and display a page provided after the payment is completed.

In operation 711, the electronic device 100 (for example, the controller 180) may perform a process for user authentication. The process for user authentication may correspond to moving the object for user authentication displayed in operation 701 to the position at which the fingerprint sensor is arranged and displaying the moved object, and performing fingerprint authentication based on a user input for selecting the displayed object for user authentication. That is, the process for user authentication may include operations 407 to 411 of FIG. 4B. Further, the process for user authentication may correspond to providing a page (for example, a login page or a payment page) associated with user authentication, receiving information required for user authentication within the page, and performing the user authentication based on the received information.

Figure 8:
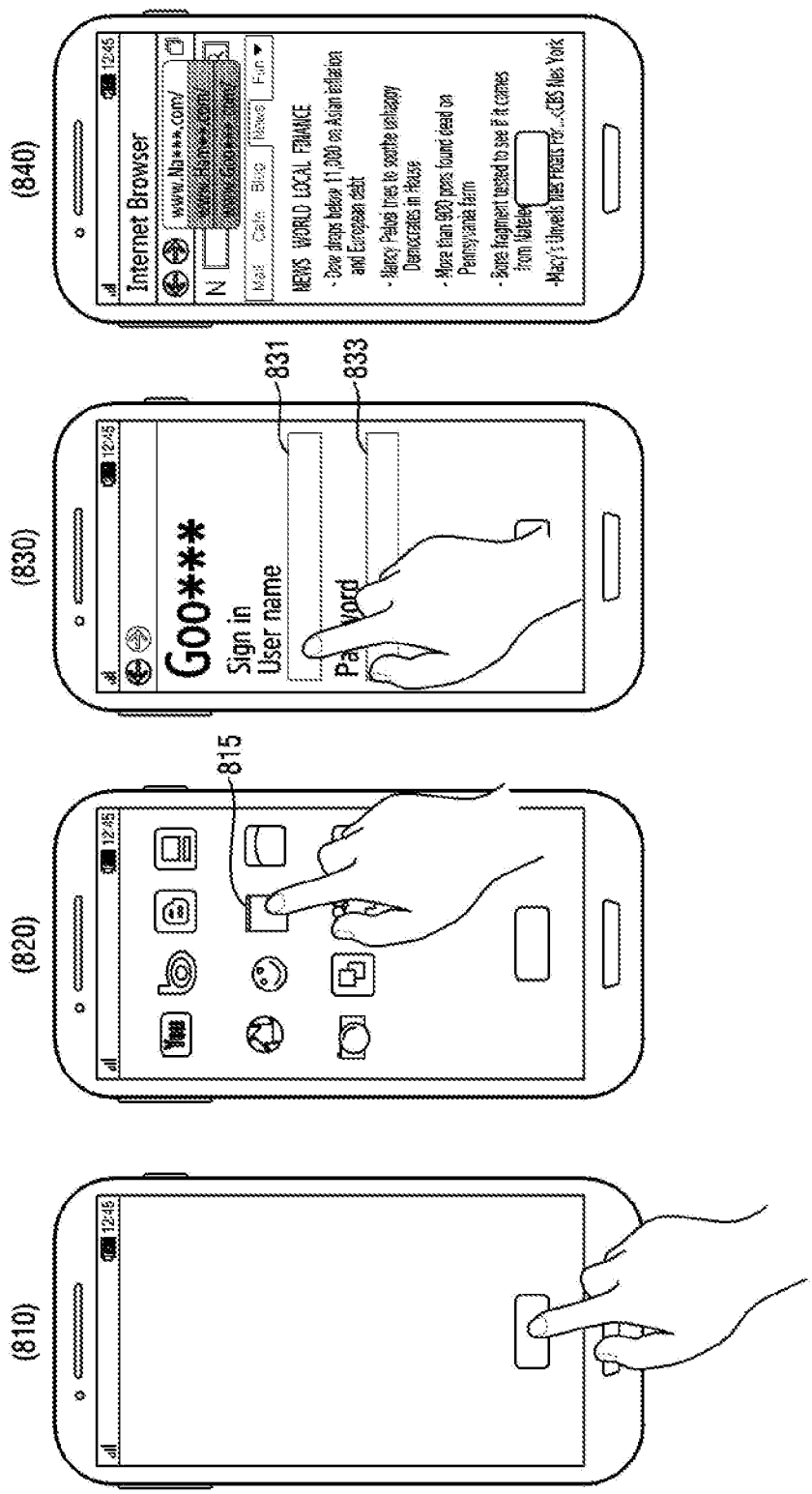
FIG. 8 illustrates examples of maintaining user authentication according to various embodiments of the present disclosure.

FIG. 8 illustrates examples of maintaining user authentication according to various embodiments of the present disclosure.

Referring to FIG. 8, the electronic device 100 (for example, the controller 180) may perform fingerprint recognition through a fingerprint sensor in a lock state 810 of the electronic device 100. When the fingerprint acquired through fingerprint sensor matches the registered fingerprint, the controller 180 may unlock the electronic device 100 and display an unlocked screen 820. The unlocked screen 820 may be a home screen (or a background screen) of the electronic device 100 or an execution screen of an application. Here, the unlocked screen 820 may be the home screen. The controller 180 may detect a user input for selecting an icon 815 of an application on the home screen. The controller 180 may execute the selected application and display an execution screen 830 of the application.

The execution screen 830 of the application may be a login page on which a user name and a password are input using a user name (or ID) input item 831 and a password input item 833. The controller 180 may determine whether the object for user authentication is included in the execution screen 830 of the application. The executions screen 830 of the application corresponds to the login page, and thus includes the object for user authentication. The controller 180 may determine whether the fingerprint authentication has been previously performed, and, when the fingerprint authentication has been performed, determine whether the authentication elapse time is equal to or shorter than a reference value. When the authentication elapse time is equal to or shorter than the reference value, the controller 180 may display a page 840 provided after the login is completed. That is, the controller 180 may display the page 840 provided after the login is completed without passing through a user authentication process in which the object for user authentication is moved to and displayed at the position of the fingerprint sensor and the fingerprint recognition is performed through the display object.

Figure 9:
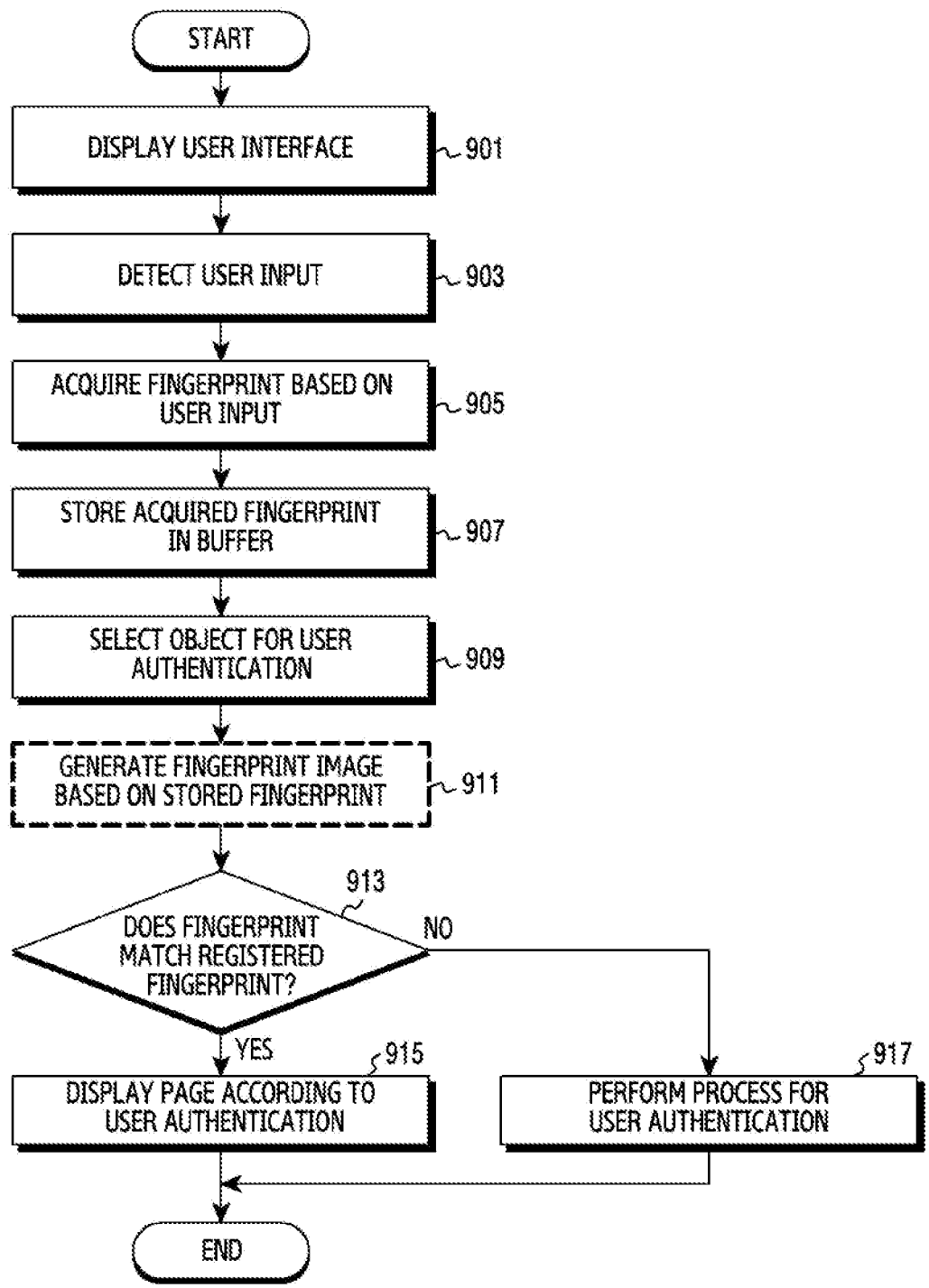
FIG. 9 is a flowchart illustrating a method of performing fingerprint authentication by an electronic device according to various embodiments of the present disclosure.

FIG. 9 is a flowchart illustrating a method of performing fingerprint authentication by an electronic device according to various embodiments of the present disclosure.

Referring to FIG. 9, in operation 901, the electronic device 100 (for example, the controller 180) may display a user interface. The user interface may be a screen provided through the display 131 of the electronic device 100. For example, the user interface may be a home screen of the electronic device 100 or an execution screen of an application.

In operation 903, the electronic device 100 (for example, the controller 180) may detect a user input. The user input may be a touch input that touches the display 131. For example, when the user interface displayed in operation 901 includes a keypad, the user input may be an input that touches the keypad. Alternatively, when the user interface displayed in operation 901 is the home screen, the user input may be an input that selects an icon of the application within the home screen or touches an area in which no icon is arranged. At this time, the user input may be a continuous touch input.

In operation 905, the electronic device 100 (for example, the controller 180) may acquire the fingerprint based on the user input. For example, the fingerprint sensor may be arranged in at least one of a partial area, a plurality of areas, and an entire area of the display 131. When the user input is detected at the position at which the fingerprint sensor is arranged, the controller 180 may detect the fingerprint. That is, when the user input is detected at the position at which the fingerprint sensor is not arranged, the controller 180 may execute a function corresponding to the user input. For example, when the user input is an input for selecting a key on the keypad, the controller 180 may input a character corresponding to the selected key into an input field in response to the user input for selecting the key at the position at which the fingerprint sensor is not arranged. Further, when the user input is detected at the position at which the fingerprint sensor is arranged, the controller 180 may acquire the fingerprint when the character corresponding to the selected key is input into the input field and simultaneously the key is pressed. According to various embodiments, the fingerprint acquired in operation 905 may be the part (for example, 30% or 50%) or the entirety of the fingerprint that the user should input.

In operation 907, the electronic device 100 (for example, the controller 180) may store the acquired fingerprint in a buffer. The controller 180 according to various embodiments may store all acquired fingerprints in the buffer. Alternatively, the controller 180 may selectively store only fingerprints available for fingerprint recognition in the buffer among all the acquired fingerprints. The buffer according to various embodiments may store a fingerprint (or fingerprint data) for a predetermined time in a first in first out (FIFO) scheme. For example, when the fingerprint is stored in the buffer, the stored fingerprint may be stored only for a predetermined time (for example, 3 minutes, 5 minutes, or 10 minutes), and when the predetermined time passes, the stored fingerprint may be deleted.

In operation 909, the electronic device 100 (for example, the controller 180) may select an object for user authentication. The controller 180 may provide a user interface different from that in operation 901 according to the user input in operation 903. The controller 180 may detect a user input that touches the object for user authentication within the user interface provided by the user input.

In operation 911, the electronic device 100 (for example, the controller 180) may generate a fingerprint image based on the stored fingerprint. The controller 180 may generate a fingerprint image based on one or more fingerprints stored in the buffer. For example, the fingerprints stored in the buffer may be fingerprint of a user's different fingers such as a thumb, an index finger, and a middle finger. In this case, the controller 180 may generate one fingerprint image for each similar or same finger. For example, the controller 180 may generate each of fingerprint images for the thumb and the index finger based on the fingerprints stored in the buffer.

The controller 180 according to various embodiments may selectively perform operation 911. That is, after performing operation 909, the controller 180 may perform operation 913 without performing operation 911. Alternatively, the controller 180 may perform operations 909 and 911, and then operation 913. Operation 911 can be omitted.

In operation 913, the electronic device 100 (for example, the controller 180) may determine whether the fingerprint matches the registered fingerprint. The controller 180 may determine whether the fingerprint stored in the buffer matches the registered fingerprint at a predetermined ratio or more. The fingerprint stored in the buffer may not have sufficient size to determine 100% matching accuracy. In this case, the controller 180 may determine whether only the part of the fingerprint matches the registered fingerprint. The predetermined ratio may be determined according to a security level of the object for user authentication.

For example, when the object for user authentication is for the login service and thus has a "low" security level, the predetermined ratio may be 50%. In this case, when the fingerprint stored in the buffer matches the registered fingerprint at a rate lower than 50%, the controller 180 may perform operation 917 for security. Alternatively, when the object for user authentication is for the payment service and thus has an "intermediate" security level, the predetermined ratio may be 70%. In this case, when the fingerprint stored in the buffer matches the registered fingerprint at a rate lower than 70%, the controller 180 may perform operation 917 for security. When the object for user authentication is for the financial service and thus has a "high" security level, the predetermined ratio may be 100%. In this case, when the fingerprint stored in the buffer matches the registered fingerprint at a rate lower than 100%, the controller 180 may perform operation 917 for security.

According to various embodiments, since the fingerprint is deleted when a predetermined time passes after the fingerprint is stored, no fingerprint data may be stored in the buffer at a time point at which a fingerprint image is generated. For example, when operation 909 is performed in an hour after operations 903 to 907 are performed, no fingerprint data may be stored in the buffer. In this case, the controller 180 may determine that re-authentication is necessary and perform operation 917.

The controller 180 may perform operation 915 when the fingerprint matches the registered fingerprint, and perform operation 917 when the fingerprint does not match the registered fingerprint.

In operation 915, the electronic device 100 (for example, the controller 180) may display a page according to user authentication. For example, the controller 180 may perform a function corresponding to the object for user authentication. When the object for user authentication is a login button, the controller 180 may transmit user information required for the login to a web server to perform the login and display a page provided after the login is completed. When the object for user authentication is a payment button, the controller 180 may transmit payment information required for payment to a server to perform the payment and display a page provided after the payment is completed.

In operation 917, the electronic device 100 (for example, the controller 180) may perform a process for user authentication. The process for user authentication may correspond to moving the object for user authentication to the position at which the fingerprint sensor is arranged and displaying the moved object, and performing fingerprint authentication based on a user input for selecting the displayed object for user authentication. That is, the process for user authentication may include operations 407 to 411 of FIG. 4. Alternatively, when the object for user authentication has been already moved to and displayed at the position at which the fingerprint sensor is arranged, the controller 180 may perform fingerprint authentication based on the user input for selecting the object for user authentication.

The controller 180 according to various embodiments may perform fingerprint authentication using the acquired fingerprint based on the user input while the continuous user input is detected, and thus identify in advance that the authenticated user is using the electronic device. In this case, the controller 180 may perform user authentication based on the previously identified fingerprint information without a separate fingerprint authentication process in the situation in which the fingerprint authentication is required.

The controller 180 according to various embodiments may identify that the authenticated user is using the electronic device through the acquired fingerprint based on the user input, and, when the continuous user input is detected, determine that the authenticated user is continuously using the electronic device and maintain the user-authenticated state. Further, when user authentication is required after the user input is stopped for a predetermined time, the controller 180 may determine that the user using the electronic device is not the authenticated user and make a request for re-authentication.

Figure 10:
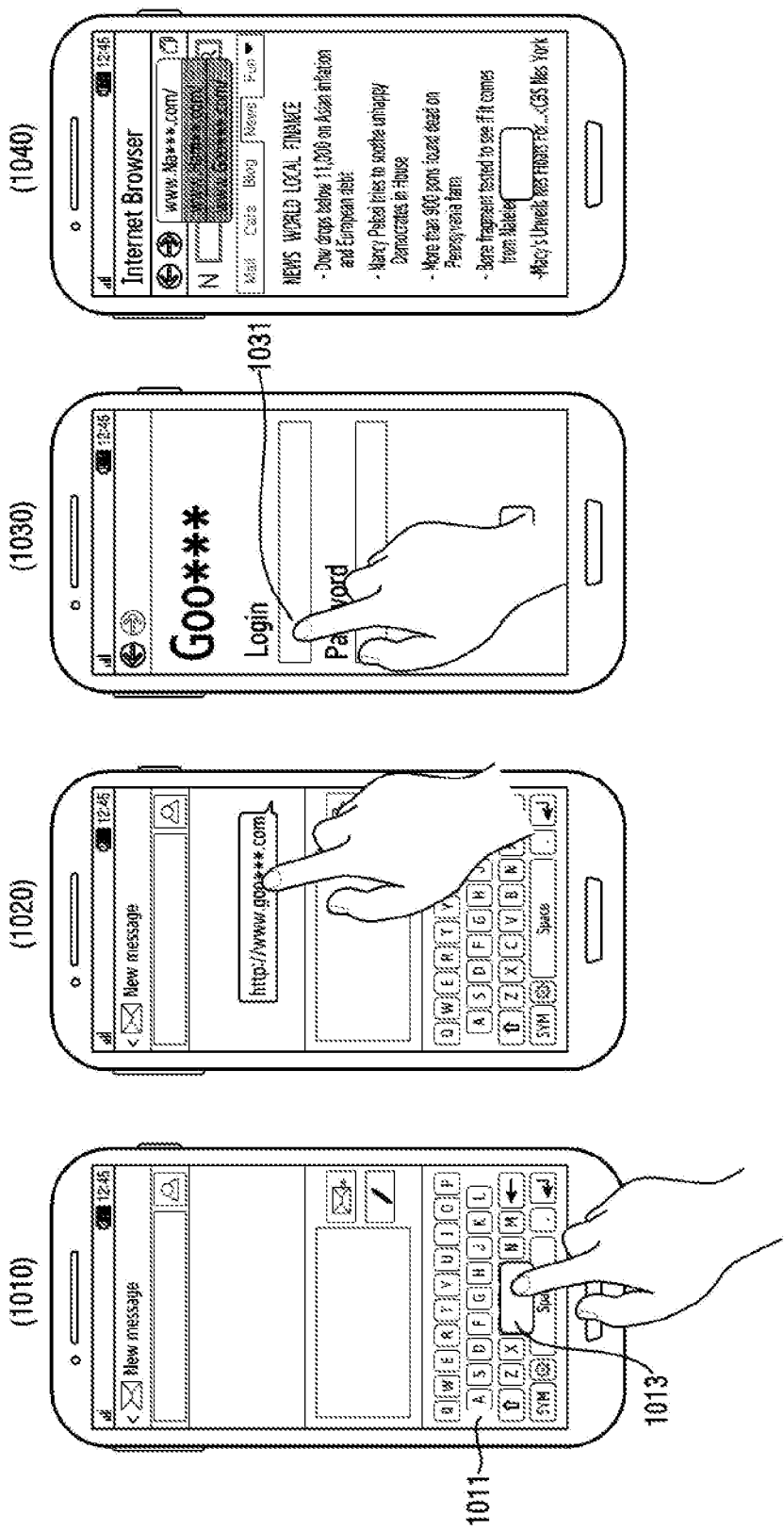
FIG. 10 illustrates examples of using a fingerprint image on different pages according to various embodiments of the present disclosure.

FIG. 10 illustrates examples of using a fingerprint image on different pages according to various embodiments of the present disclosure.

Referring to FIG. 10, the electronic device 100 (for example, the controller 180) may detect a user input on a keypad 1011 within an execution screen 1010 of a message application. When the user input is detected at a position 1013 at which a fingerprint sensor is arranged, the controller 180 may acquire the fingerprint based on the detected user input. The controller 180 may perform fingerprint authentication through the acquired fingerprint, and when the acquired fingerprint matches the registered fingerprint, determine that the user authentication is completed. The controller 180 may display an execution screen 1030 of a browser application based on a user input for selecting a URL within the execution screen 1020 of the message application.

The controller 180 may determine whether an object for user authentication is included within the execution screen 1030 of the browser application. The execution screen 1030 of the browser application may be a login page on which a user name and a password are input and may include the object for user authentication. The controller 180 may determine whether fingerprint authentication has been previously performed in response to a user input 1031 that selects an item for inputting the user name. For example, the controller 180 may determine whether fingerprint authentication has been previously performed in the message application displayed before the execution screen 1030 of the browser application. When the fingerprint authentication is completed by the user input detected on the keypad 1011 within the execution screen 1010 of the message application, the controller 180 may perform user authentication within the execution screen 1030 of the browser application based on fingerprint information used for the completed fingerprint authentication. When the user authentication is completed, the controller 180 may provide a page 1040 provided after the login is completed.

Only when the request for user authentication is made within the execution screen 1030 of the browser application within a reference value (or a reference time) after the fingerprint authentication is completed within the execution screen 1010 of the message application, the controller 180 according to various embodiments may perform the user authentication within the execution screen 1030 of the browser application based on the fingerprint information used for the completed fingerprint authentication. When the request for user authentication is made within the execution screen 1030 of the browser application after a reference value after the fingerprint authentication is completed within the execution screen 1010 of the message application, the controller 180 may make a request for re-authentication.

Figure 11:
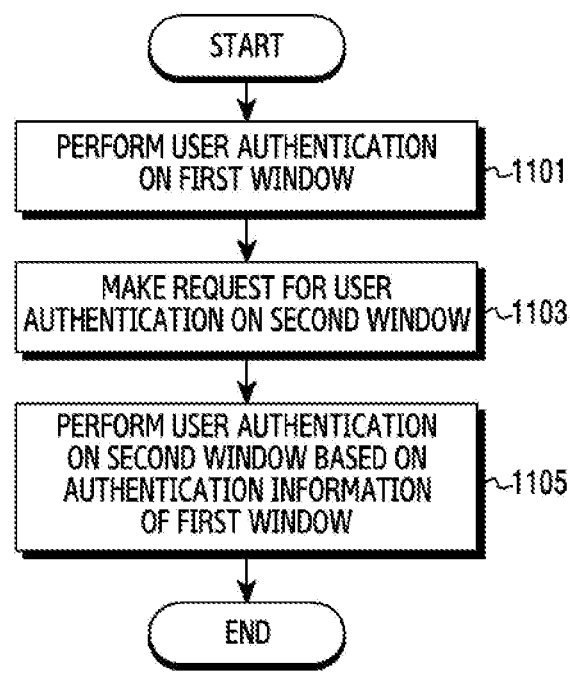
FIG. 11 is a flowchart illustrating a method of applying an authentication result by an electronic device according to various embodiments of the present disclosure.

FIG. 11 is a flowchart illustrating a method of applying an authentication result by an electronic device according to various embodiments of the present disclosure.

Referring to FIG. 11, in operation 1101, the electronic device 100 (for example, the controller 180) may perform user authentication on a first window. The first window may be one window on multiple windows. Alternatively, the first window may refer to one display on multiple displays. The user authentication may refer to user authentication through fingerprint recognition. The user authentication may include the fingerprint authentication described in FIGS. 4A and 4B, 7, and 9.

In operation 1103, the electronic device 100 (for example, the controller 180) may make a request for user authentication on a second window. The second window may refer to another window other than the first window on which the user authentication is completed. The request for user authentication may correspond to selecting an object for user authentication such as a member joining service, a login service, a payment service, or a financial service on the second window.

In operation 1105, the electronic device 100 (for example, the controller 180) may perform user authentication on the second window based on the authentication information of the first window. The controller 180 may perform user authentication on the second window based on the fingerprint information acquired from the first window. When the user authentication is completed, the controller 180 may display a page provided after the user authentication within the second window is completed.

Figure 12:
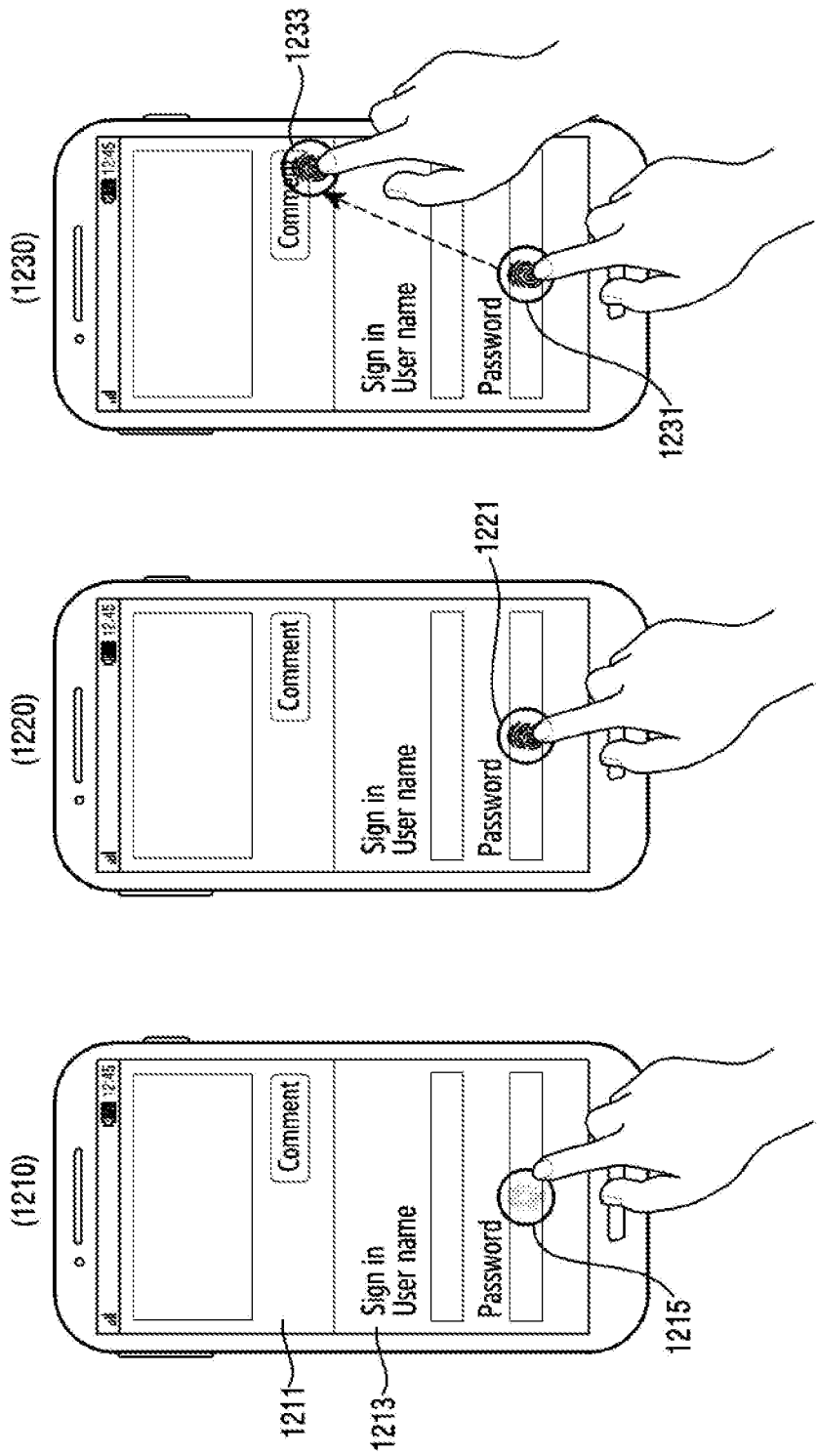
FIG. 12 illustrates examples of applying an authentication result on multiple windows according to various embodiments of the present disclosure.

FIG. 12 illustrates examples of applying an authentication result on multiple windows according to various embodiments of the present disclosure.

Referring to FIG. 12, the electronic device 100 (for example, the controller 180) may provide a multi-window 1210 including a first window 1211 that displays a page associated with a social network service and a second window 1213 that displays a page associated with a login page. When user authentication within the second window 1213 is needed, the controller 180 may display a floating button 1215 at a position at which a fingerprint sensor is arranged. The controller 180 may detect a user input on the floating button 1221 and acquire a fingerprint by the detected user input. A second multi-window 1220 illustrates an example of acquiring a fingerprint through a floating button 1221. The controller 180 may perform fingerprint authentication by comparing the acquired fingerprint with the registered fingerprint. After the fingerprint authentication is completed on the second window, the controller 180 may maintain the displaying of the floating button 1231. On a third multi-window 1230, the controller 180 may detect a user input for moving the floating button 1231 within the second window to the first window. The controller 180 may determine that the request for user authentication is made on the second window by the user input for moving the floating button 1231 within the second window to the first window. When the floating button 1233 moves to the first window, the controller 180 may use fingerprint information, which has been used for fingerprint authentication on the second window, for the user authentication. The controller 180 may perform user authentication within the first window based on the fingerprint information on the second window.

Figure 13A:
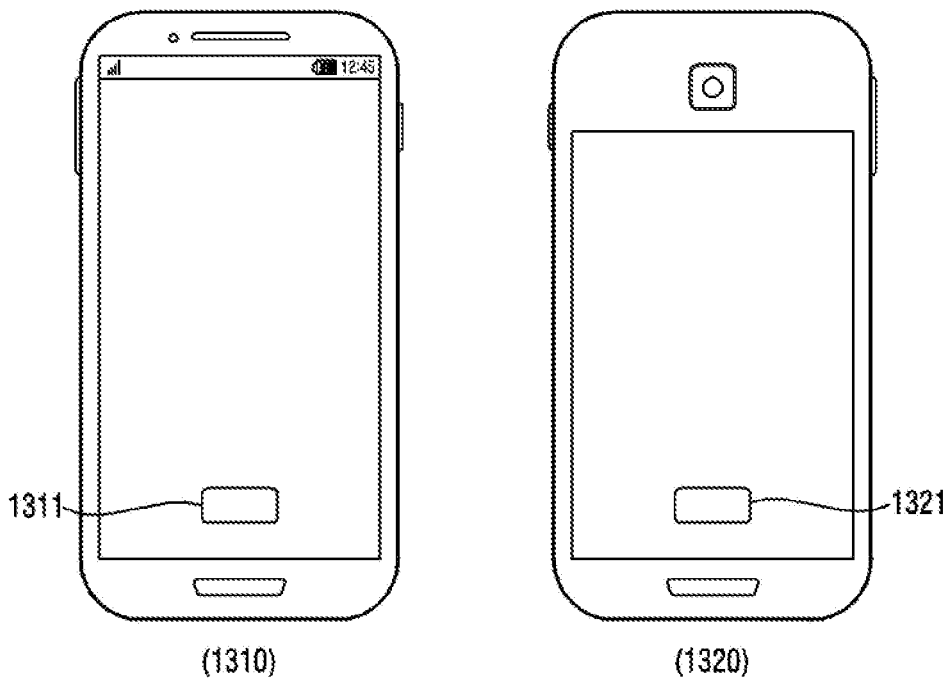
FIGS. 13A and 13B illustrate examples of applying an authentication result on a two-sided display according to various embodiments of the present disclosure.
Figure 13B:
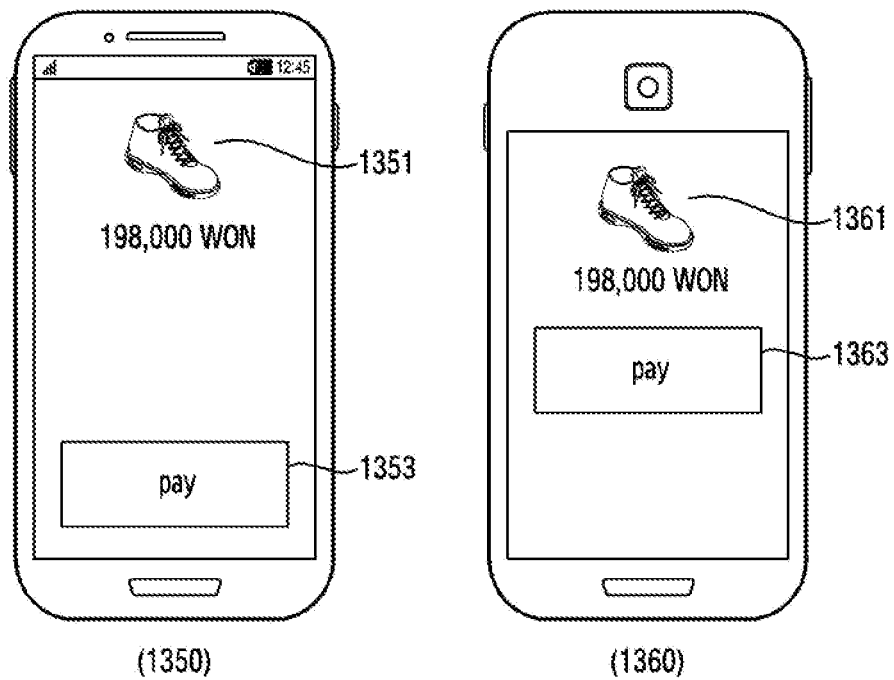

FIGS. 13A and 13B illustrate examples of applying an authentication result on a two-sided display according to various embodiments of the present disclosure.

FIG. 13A illustrates an example of arranging a fingerprint sensor on a display.

Referring to FIG. 13A, the electronic device 100 may include a first display 1310 on the front surface of the electronic device 100 and a second display 1320 on the rear surface of the electronic device 100. On the first display 1310 and the second display 1320, fingerprint sensors having different fingerprint recognition rates may be arranged. As the fingerprint recognition rate is higher, fingerprint accuracy may be higher. Alternatively, the fingerprint sensor may be embedded into only one of the first display 1310 and the second display 1320. For example, a first fingerprint sensor 1311 may be arranged on the first display 1310 and a second fingerprint sensor 1321 may be arranged on the second display 1320. For example, the first fingerprint sensor 1311 may have a fingerprint recognition rate lower than that of the second fingerprint sensor 1321. Alternatively, the second fingerprint sensor 1321 may have a fingerprint recognition rate lower than that of the first fingerprint sensor 1311.

The controller 180 of the electronic device 100 according to various embodiments may determine the fingerprint sensor to be used for fingerprint recognition based on a security level of user authentication. For example, the controller 180 may use the fingerprint sensor having the high fingerprint recognition rate for user authentication such as payment and financial transactions, and use the fingerprint sensor having the low fingerprint recognition rate for user authentication such as membership registration or login.

FIG. 13B illustrates an example of using fingerprint sensors for a both-sided display.

Referring to FIG. 13B, a fingerprint sensor may be embedded into a first display 1350 located on the front surface of the electronic device 100, and a fingerprint sensor may not be embedded into a second display 1360 located on the rear surface of the electronic device 100. In this case, the controller 180 of the electronic device 100 may perform a control to use a result of fingerprint authentication performed on the first display 1350 for the second display 1360. That is, when an object that requires user authentication is selected on the second display 1360 within a predetermined time, the controller 180 may use an authentication result on the first display 1350. For example, when the user identifies product information 1351 on the first display 1350 and selects a payment button 1353, the controller 180 may perform fingerprint authentication based on the fingerprint acquired when the payment button 1353 is selected. When the fingerprint authentication is completed, the controller 180 may keep the fingerprint information acquired on the first display 1350 to be used on the second display 1360.

The controller 180 according to various embodiments may display the payment button 1353 at a position at which the fingerprint sensor is arranged on the first display 1350 including the fingerprint sensor and display the payment button 1363 at an original position on the second display 1360 including no fingerprint sensor with respect to the same page including the same objects (for example, the product information and the payment button). When the user identifies the product information 1361 on the second display 1360 and selects the payment button 1363, the controller 180 may indicate fingerprint authentication through the first display 1350 for fast user authentication. The controller 180 may display a notification message (for example, a popup message, an icon, or an arrow) to enable the user to switch the second display 160 to the first display 1350. When the second display 1360 switches to the first display 1350 for fast user authentication, the controller 180 may detect a user input on the payment button 1353 on the first display 1350 and perform fingerprint authentication. After the fingerprint authentication is completed, the user may switch back the first display 1350 to the second display 1360.

A method of operating an electronic device according to various embodiments may include an operation of identifying at least one object included in content to be displayed through a display functionally connected to the electronic device, an operation of determining whether there is an object for user authentication in the identified objects, and an operation of, when there is the object for user authentication on the page, displaying the object for user authentication in at least a partial display area of the display in which a fingerprint sensor is formed.

A method of operating an electronic device according to various embodiments may include an operation of identifying at least one object included in a screen to be displayed through a display functionally connected to the electronic device, an operation of determining whether one of the at least one object corresponds to an object for user authentication, an operation of, when the at least one object does not correspond to the object for user authentication, displaying the at least one object at a first predetermined position, and an operation of, when the at least one object corresponds to the object for user authentication, displaying another object corresponding to the at least one object at a second predetermined position.

The first predetermined position may be a position at which the at least one object is originally displayed within the content, and the second predetermined position may be a position at which the fingerprint sensor is arranged on the display.

The method may further include an operation of detecting a user input on the object for user authentication displayed in at least the partial display area of the display in which the fingerprint sensor is formed, an operation of recognizing a fingerprint through the fingerprint sensor based on the user input, and an operation of, when fingerprint authentication is completed, performing a function associated with the object for user authentication.

The operation of performing the function may include an operation of determining whether the fingerprint acquired based on the user input matches fingerprint information stored in a memory of the electronic device, and an operation of, when the acquired fingerprint matches the fingerprint information stored in the memory, transmitting user information or payment information stored in the memory to an external electronic device of the electronic device based on the object for user authentication.

The method may further include an operation of storing a predetermined position of the at least one object on a framework and storing at least one piece of information selected from at least one piece of fingerprint information, at least one piece of user information, and at least one piece of payment information in the memory.

The method may further include an operation of selecting a fingerprint to be used for fingerprint recognition based on a security level of the at least one object.

The method may further include an operation of maintaining a user-authenticated state for a predetermined time after fingerprint authentication.

The method may further include an operation of acquiring fingerprint data based on the user input while a continuous user input is detected and performing fingerprint authentication according to whether the acquired fingerprint data matches a registered fingerprint.

The method may further include an operation of performing user authentication within a second application based on authenticated fingerprint information within a first application.

The method may further include an operation of performing user authentication within a second window based on authenticated fingerprint information within a first window of a multi-window.

A computer-readable recording medium according to various embodiments may record a program for executing an operation of identifying content including at least one object to be displayed on the display of the electronic device, an operation of, when the content is not associated with acquisition of fingerprint information, displaying the at least one object at a predetermined positions, and an operation of, when the content is associated with the acquisition of the fingerprint information, displaying the at least one object in at least the part of the display area in which the fingerprint sensor is formed.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. An electronic device comprising:
   a display;
   a fingerprint sensor disposed under least a part of a display area of the display; and
   a processor configured to:
      identify content including first and second user selectable objects to be displayed on the display at first and second predetermined positions within the content,
      when the first user selectable object is not associated with acquisition of fingerprint information, display the first user selectable object at the first predetermined position, and
      in response to a determination that the second user selectable object within the content is associated with the acquisition of the fingerprint information, display the second user selectable object by moving from the second predetermined position to a position at which the fingerprint sensor is disposed.
2. The electronic device of claim 1, wherein the processor is further configured to change attributes of at least one of the first and second user selectable objects based on attribute information of the fingerprint sensor.
3. The electronic device of claim 1, wherein the processor is further configured to:
   detect a user input on the second user selectable object displayed at a position at which the fingerprint sensor is disposed, and recognize a fingerprint using the fingerprint sensor based on the user input.

4. The electronic device of claim 3, wherein, when fingerprint authentication is completed, the processor is further configured to perform a function associated with the second user selectable object.

5. The electronic device of claim 1, further comprising a memory configured to:
    store the first and second predetermined positions of the first and second user selectable objects on a framework, and
    store at least one piece of information selected from at least one piece of fingerprint information, at least one piece of user information, and at least one piece of payment information.

6. The electronic device of claim 5, wherein the processor is further configured to:
    determine whether a fingerprint acquired from a user matches the fingerprint information stored in the memory, and
    when the fingerprint matches the fingerprint information, transmit the at least one piece of user information or the payment information to an external electronic device.

7. The electronic device of claim 1, wherein the fingerprint sensor is configured to be included in at least one of a partial area, a plurality of areas, or an entire area of the display.

8. The electronic device of claim 1, wherein the display is configured to be arranged at each of a front surface and a rear surface of the electronic device and fingerprint sensors having different fingerprint recognition rates are configured to be arranged at the front surface and the rear surface of the electronic device.

9. The electronic device of claim 8, wherein the processor is further configured to select a fingerprint to be used for fingerprint recognition based on a security level of at least one of the first user selectable object or the second user selectable object.

10. The electronic device of claim 1, wherein the processor is further configured to maintain a user-authenticated state for a predetermined time after fingerprint authentication.

11. The electronic device of claim 1, wherein the processor is further configured to:
    acquire fingerprint data based on a user input while a continuous user input is detected, and
    perform fingerprint authentication according to whether the acquired fingerprint data matches a registered fingerprint.

12. The electronic device of claim 1, wherein the processor is further configured to perform user authentication within a second application based on authenticated fingerprint information within a first application.

13. The electronic device of claim 1, wherein the processor is further configured to perform user authentication within a second window based on authenticated fingerprint information within a first window of a multi-window.

* * * * *